(12) United States Patent
Yabuki

(10) Patent No.: US 8,719,636 B2
(45) Date of Patent: May 6, 2014

(54) APPARATUS METHOD, AND STORAGE MEDIUM FOR FAULT CAUSE EXTRACTION UTILIZING PERFORMANCE VALUES

(75) Inventor: Kentarou Yabuki, Tokyo (JP)

(73) Assignee: NEC Corporation, Tokyo (JP)

( * ) Notice: Subject to any disclaimer, the term of this patent is extended or adjusted under 35 U.S.C. 154(b) by 335 days.

(21) Appl. No.: 13/143,695

(22) PCT Filed: Jan. 14, 2011

(86) PCT No.: PCT/JP2011/051031
§ 371 (c)(1),
(2), (4) Date: Jul. 7, 2011

(87) PCT Pub. No.: WO2011/099341
PCT Pub. Date: Aug. 18, 2011

(65) Prior Publication Data
US 2012/0030522 A1 Feb. 2, 2012

(30) Foreign Application Priority Data
Feb. 15, 2010 (JP) .................................. 2010-030071

(51) Int. Cl.
*G06F 11/00* (2006.01)

(52) U.S. Cl.
USPC .................. 714/26; 714/27; 714/33; 714/37; 714/47.3

(58) Field of Classification Search
None
See application file for complete search history.

(56) References Cited

U.S. PATENT DOCUMENTS

| 7,542,877 B2 | 6/2009 | Nakamura | |
| RE43,154 E * | 1/2012 | Gross et al. | 714/39 |
| 8,190,949 B2 * | 5/2012 | Kato | 714/47.1 |
| 8,225,144 B2 * | 7/2012 | Kato | 714/47.1 |
| 8,286,035 B2 * | 10/2012 | Kato | 714/47.1 |
| 2008/0004841 A1 | 1/2008 | Nakamura | |
| 2009/0216624 A1 * | 8/2009 | Kato | 705/10 |
| 2009/0217099 A1 * | 8/2009 | Kato | 714/37 |
| 2010/0205483 A1 * | 8/2010 | Ishiou | 714/26 |
| 2010/0223506 A1 * | 9/2010 | Handley et al. | 714/37 |
| 2011/0214020 A1 * | 9/2011 | Caspi et al. | 714/37 |
| 2012/0151053 A1 * | 6/2012 | Kato | 709/224 |
| 2012/0192014 A1 * | 7/2012 | Kato | 714/47.1 |
| 2013/0138594 A1 * | 5/2013 | Kato | 706/46 |
| 2013/0159778 A1 * | 6/2013 | Yabuki | 714/37 |

FOREIGN PATENT DOCUMENTS

| JP | 5-035769 A | 2/1993 |
| JP | 9-307550 A | 11/1997 |

(Continued)

*Primary Examiner* — Christopher McCarthy
(74) *Attorney, Agent, or Firm* — McGinn IP Law Group, PLLC

(57) ABSTRACT

Performance information which is a possible generation cause of a fault is extracted accurately.
A fault cause extraction apparatus 10 includes a storage unit 12 and a correlation-destruction-propagation detecting unit 25. Here, the storage unit 12 stores a correlation model including one or more correlation functions, each of which is generated based on a time series of performance information including a plurality of types of performance values in a system and transforms a performance value for one of the types being an input to a performance value for another one of the types being an output. The correlation-destruction-propagation detecting unit 25 calculates a degree of influence of a performance value for a base point that is one of the types upon the system, based on the number of base point propagation functions, the base point propagation functions being the correlation functions used to transform a performance value for the base point to a performance value for one of other the types being transformable from the base point directly or indirectly and not being input of the correlation function.

20 Claims, 21 Drawing Sheets

(56) References Cited

FOREIGN PATENT DOCUMENTS

| | | |
|---|---|---|
| JP | 10-257054 A | 9/1998 |
| JP | 2007-227481 A | 9/2007 |
| JP | 2008-009842 A | 1/2008 |
| JP | 2009-199533 A | 9/2009 |
| JP | 2009-199534 A | 9/2009 |

\* cited by examiner

| DATE AND TIME | PERFORMANCE INFORMATION | | | | |
|---|---|---|---|---|---|
| | SV1.CPU | SV1.MEM | SV2.CPU | SV2.MEM | ... |
| 2010/1/5 17:25 | 12 | 80 | 33 | 41 | ... |
| 2010/1/5 17:26 | 15 | 79 | 32 | 46 | ... |
| 2010/1/5 17:27 | 34 | 51 | 32 | 54 | ... |
| 2010/1/5 17:28 | 63 | 51 | 35 | 60 | ... |
| ... | ... | ... | ... | ... | ... |
| 2010/1/7 8:31 | 20 | 79 | 90 | 20 | ... |

| INPUT | OUTPUT | COEFFICIENT A | COEFFICIENT B | WEIGHT w | VALIDITY | ... |
|---|---|---|---|---|---|---|
| SV1.CPU | SV1.MEM | -0.6 | 100 | 0.88 | ○ | ... |
| ... | ... | ... | ... | ... | ... | ... |
| SV3.CPU | SV3.MEM | -0.3 | 100 | 0.63 | ○ | ... |
| SV2.CPU | SV2.MEM | 2.0 | -10 | 0.51 | ○ | ... |
| ... | ... | ... | ... | ... | ... | ... |

Fig.8

| INPUT | OUTPUT | CORRELATION DESTRUCTION DEGREE |
|---|---|---|
| SV1.CPU | SV2.CPU | 0.6 |
| SV1.MEM | SV2.CPU | 0.6 |
| ... | ... | ... |

33

APPARATUS METHOD, AND STORAGE MEDIUM FOR FAULT CAUSE EXTRACTION UTILIZING PERFORMANCE VALUES

TECHNICAL FIELD

The present invention relates to a fault cause extraction apparatus, fault cause extraction method and program recording medium.

BACKGROUND ART

In large scale information systems such as business information systems and IDC (Internet Data Center) systems, in accordance with an increase in importance of information and communication services such as web services and business services as social infrastructures, computer systems providing these services are required to keep operating steadily. Operations management of such computer systems is usually performed manually by administrators. As the systems have become large-scaled and complicated, a load of the administrator has increased tremendously, and a service suspension due to misjudgment or erroneous operation has become more possible to occur.

For this reason, there have been provided integrated fault cause extraction system which monitors and controls, in a unified manner, the operating states of hardware and software included in the above-mentioned systems. The integrated fault cause extraction system acquires information on the operating states of hardware and software in a plurality of computer systems, which are managed by the integrated systems, and outputs the information to a fault cause extraction apparatus connected to the integrated systems. Means to distinguish a fault of the managed system include the one with setting a threshold value for operating information in advance, and the one with evaluating a deviation of the operating information from its average value.

For example, in the fault cause extraction apparatus of the fault cause extraction system, threshold values are set for individual pieces of performance information and a fault is detected by finding the individual pieces of performance information exceeding the respective threshold values. The fault cause extraction apparatus sets a value indicating abnormality in advance as a threshold value, detects abnormality of individual elements and reports it to an administrator.

When detection of abnormality is reported, the administrator needs to identify a cause of the abnormality generation in order to settle it. A typical cause of the generation is, for example, CPU overload, insufficient memory capacity or network overload. However, in order to identify the cause of the generation, it is required to identify a computer which is likely to be related to the generation, and then to investigate its system logs and parameters. This operation requires each administrator to have a high degree of knowledge or know-how, and to spend much time and effort.

Due to this, the integrated fault cause extraction systems provide the administrator with the support for countermeasures, by performing correlation analysis on combinations of operating states and so on automatically, based on event data (state notification) acquired from a plurality of equipments, and estimating problems or causes from a wider standpoint and then notifying the administrators of them. In particular, for ensuring reliability in long-term continual operation of the services, it is required not only to take measures against the abnormalities which have already occurred but also to extract an element which is a possible cause of future abnormalities, even if the abnormalities have not occurred clearly at present, and then to take measures such as equipment reinforcement in a planned way.

Such fault cause extraction systems or the technologies related to correlation analysis and applicable in the systems have been described, for example, in each of the patent documents shown below.

Japanese Patent Application Laid-Open No. 2009-199533 discloses a technology which generates a correlation model by deriving a transform function with regard to time series of the values of two arbitrary performance information (performance values) in normal state, regarding one series as an input and the other as an output, compares the performance values according to the transform function of the correlation model with the performance information acquire at another time, and, detects a fault based on a degree of destruction of the correlation.

Japanese Patent Application Laid-Open No. 2009-199534 discloses a fault cause extraction apparatus which predicts a bottleneck that may occur in actual operation by utilizing a correlation model similar to that of Japanese Patent Application Laid-Open No. 2009-199533. Japanese Patent Application Laid-Open No. 2007-227481 discloses a technology which, in identification of production failures of semiconductor wafers, utilizes correlations derived from two-dimensional images, via resistances and so on, which are obtained by applying an electric current to the test patterns on a wafer. Japanese Patent Application Laid-Open No. H05-035769 discloses a correlation analysis apparatus which analyzes the presence or absence of "point of correlation abnormality" and, if the "point of correlation abnormality" exists, excludes the point from the analysis.

Furthermore, Japanese Patent Application Laid-Open No. H09-307550 discloses a network monitoring apparatus which, in the analysis of a network system, extracts a "representative alarm" from a lot of "alarms" that occurred, by focusing on regularity. Japanese Patent Application Laid-Open No. H10-257054 discloses a network management apparatus which, based on a correlation value between the fault events that occurred at a first and a second node groups, acquires their correspondence relation.

SUMMARY OF INVENTION

Technical Problem

With a technology described in Japanese Patent Application Laid-Open No. 2009-199533, it is possible to calculate a degree of abnormality for equipment neighboring in terms of physical connection relationship, by utilizing a sum or a proportion of the number of destructed correlations or degree of the destruction among correlations related to certain performance information. With this technology, it is possible to extract the performance information which is a possible cause of a fault, by detecting destruction of a correlation, even if the abnormalities have not occurred clearly at present, and then to take measures such as equipment reinforcement.

However, there has been found a phenomenon, in actual system operation, where certain destruction of a correlation propagates to other correlations and further does to still other correlations, and repeats that to exert an influence upon the whole of the system. This propagation of the destruction of the correlation is not taken into account in the technology described in Japanese Patent Application Laid-Open No. 2009-199533, and cannot be detected with the technology. Similarly, any technology focusing on the propagation of the destruction of the correlation and thereby detecting it is not disclosed in either of Japanese Patent Application Laid-Open No. 2009-199534, Japanese Patent Application Laid-Open No. 2007-227481, Japanese Patent Application Laid-Open No. H05-035769, Japanese Patent Application Laid-Open No. H09-307550 and Japanese Patent Application Laid-Open No. H10-257054. Due to this, with the technologies described above, is impossible to extract accurately the performance information which is a possible generation cause of a fault, in the case where the destruction of the correlation propagates.

It is an object of this invention to provide a fault cause extraction apparatus, fault cause extraction method and program recording medium which make it possible to extract accurately the performance information which is a possible generation cause of a fault, when there is propagation of the destruction of the correlation.

Solution to Problem

A fault cause extraction apparatus according to an exemplary aspect of the invention includes storage means for storing a correlation model including one or more correlation functions, each of which is generated based on a time series of performance information including a plurality of types of performance values in a system and transforms a performance value for one of the types being an input to a performance value for another one of the types being an output, and correlation-destruction-propagation detecting means for calculating a degree of influence of a performance value for a base point that is one of the types upon the system, based on the number of base point propagation functions, the base point propagation functions being the correlation functions used to transform a performance value for the base point to a performance value for one of other the types being transformable from the base point directly or indirectly and not being input of the correlation function.

A fault cause extraction method according to an exemplary aspect of the invention includes storing a correlation model including one or more correlation functions, each of which is generated based on a time series of performance information including a plurality of types of performance values in a system and transforms a performance value for one of the types being an input to a performance value for another one of the types being an output, and calculating a degree of influence of a performance value for a base point that is one of the types upon the system, based on the number of base point propagation functions, the base point propagation functions being the correlation functions used to transform a performance value for the base point to a performance value for one of other the types being transformable from the base point directly or indirectly and not being input of the correlation function.

A program recording medium according to an exemplary aspect of the invention, records thereon a program causing computer to perform a method including storing a correlation model including one or more correlation functions, each of which is generated based on a time series of performance information including a plurality of types of performance values in a system and transforms a performance value for one of the types being an input to a performance value for another one of the types being an output, and calculating a degree of influence of a performance value for a base point that is one of the types upon the system, based on the number of base point propagation functions, the base point propagation functions being the correlation functions used to transform a performance value for the base point to a performance value for one of other the types being transformable from the base point directly or indirectly and not being input of the correlation function.

Advantageous Effects of Invention

Advantageous effect of the present invention is that it is possible to extract accurately the performance information which is a possible generation cause of a fault, when there is propagation of the destruction of the correlation.

FIG. [2] An explanatory diagram showing an example of schematic whole configuration of a fault cause extracting system, which includes the fault cause extracting apparatus, according to the first exemplary embodiment of the present invention.

Figure 1:
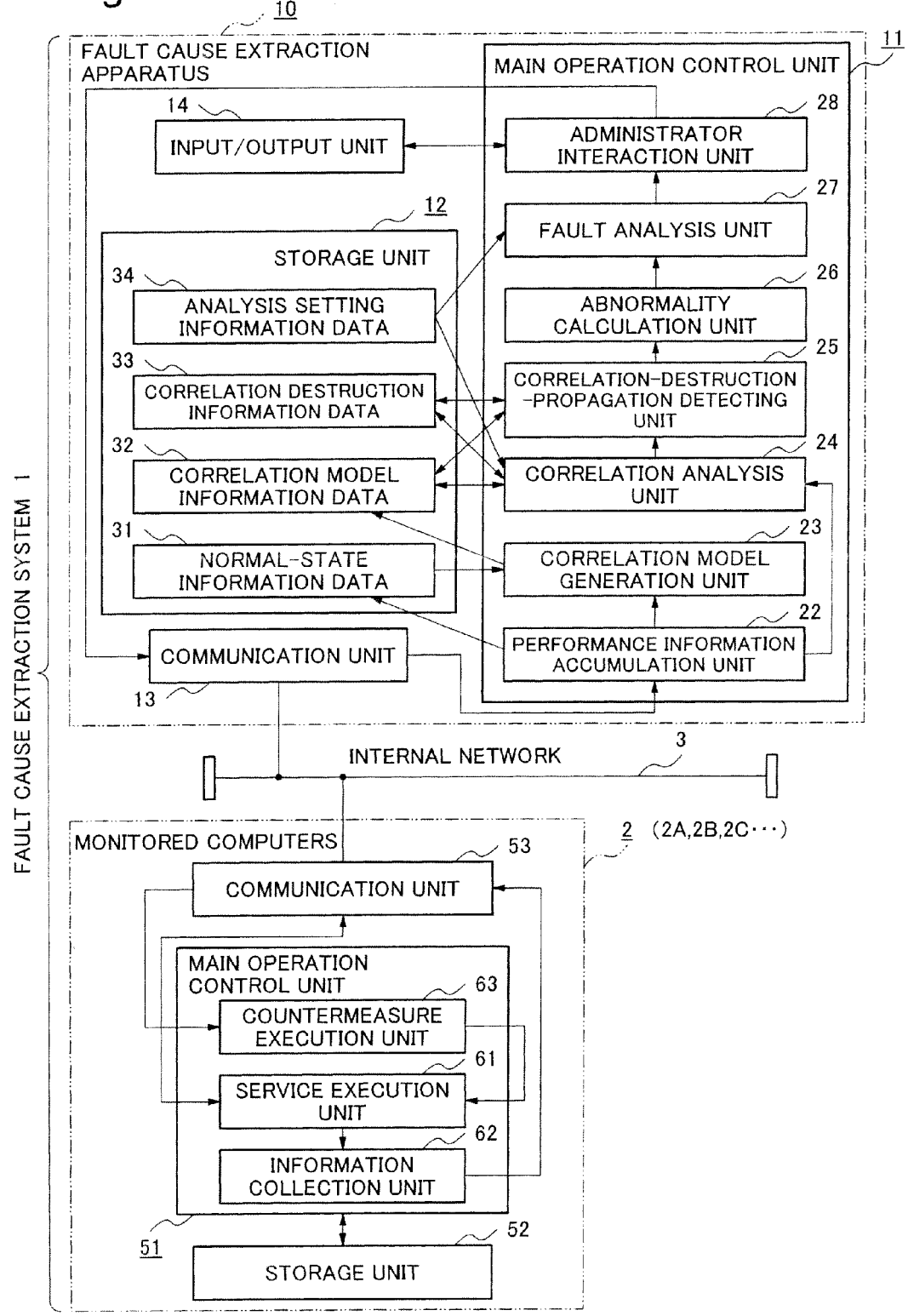
[FIG. 1] An explanatory diagram showing configurations of a fault cause extraction apparatus and monitored computers, both according to a first exemplary embodiment of the present invention.

FIG. [3] An explanatory diagram showing a flow of processing performed by the fault cause extraction apparatus presented in FIG. 1.

Figure 3:
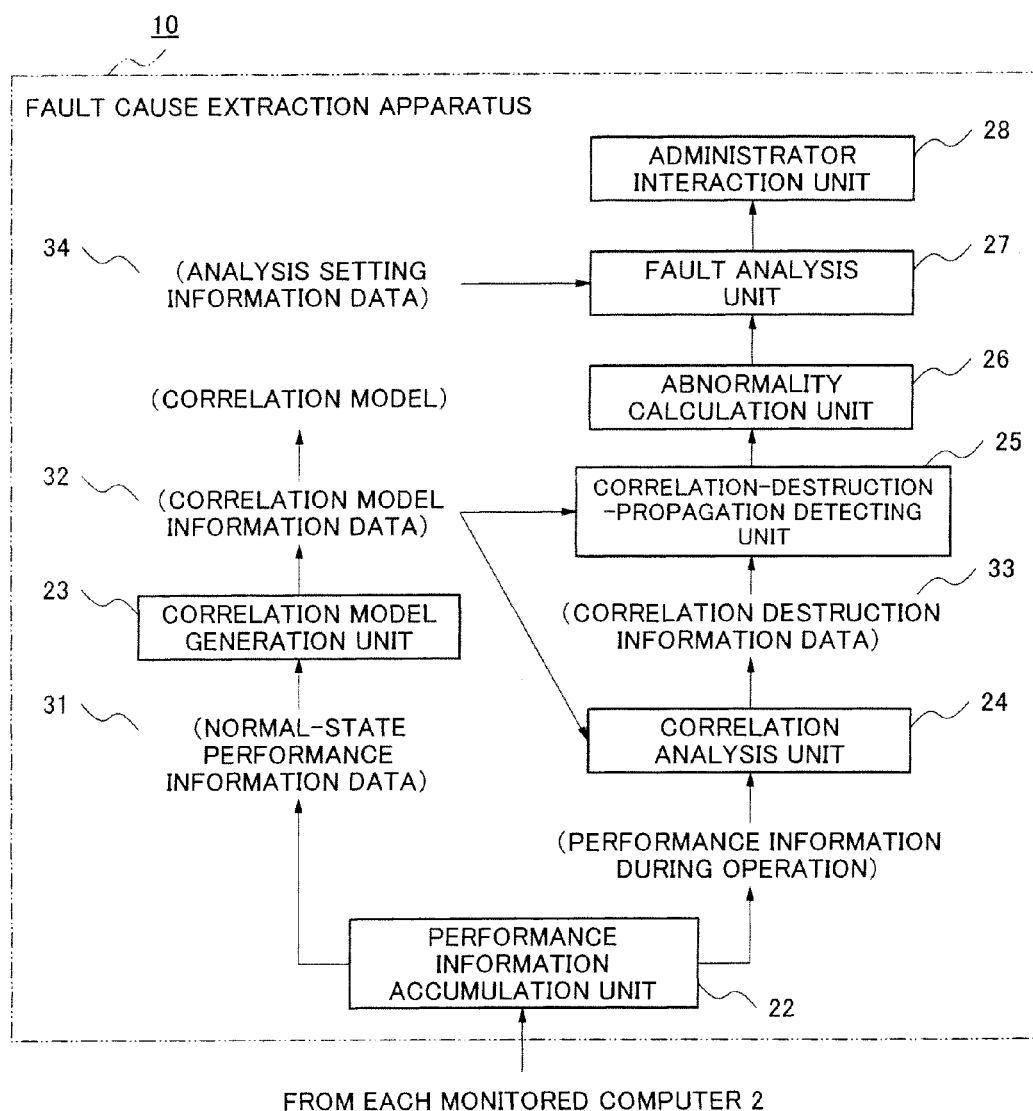

FIG. [4] An explanatory diagram showing an example of normal-state performance information data which is accumulated in a performance information accumulation unit shown in FIGS. 1 and 3.

FIG. [5] An explanatory diagram showing an example of a correlation model generation process with regard to the normal-state performance information data presented in FIG. 4.

FIG. [6] An explanatory diagram showing an example of the correlation model information data generated from the normal-state performance information data by a correlation model generation unit.

Figure 6:
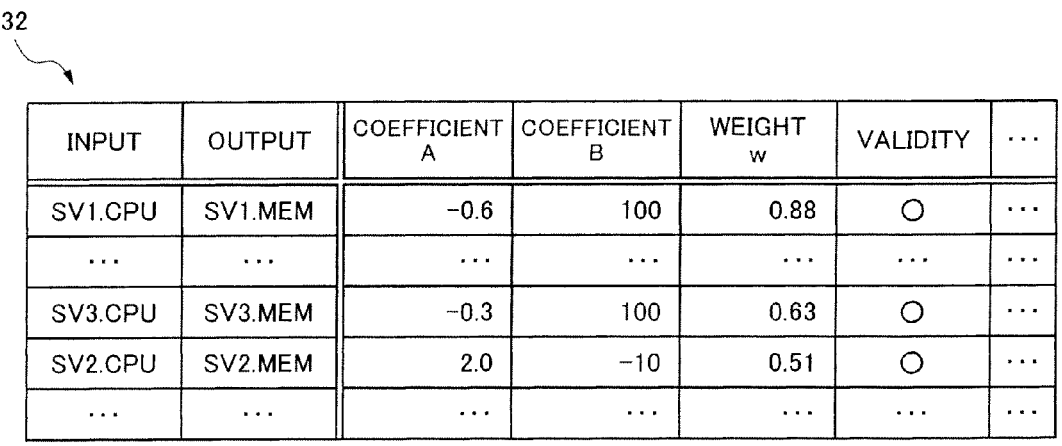

FIG. [7] An explanatory diagram showing examples of a correlation chart which can be drawn based on the correlation model information data presented in FIG. 6.

FIG. [8] An explanatory diagram showing an example of the correlation destruction information data presented in FIGS. 1 and 3.

FIG. [9] An explanatory diagram showing an example of calculation regarding propagation of the correlation destruction performed by a correlation-destruction-propagation detecting unit and an abnormality calculation unit.

FIG. [10] A flow chart showing an example of processing in the fault cause extraction apparatus according to the first exemplary embodiment of the present invention.

Figure 10:
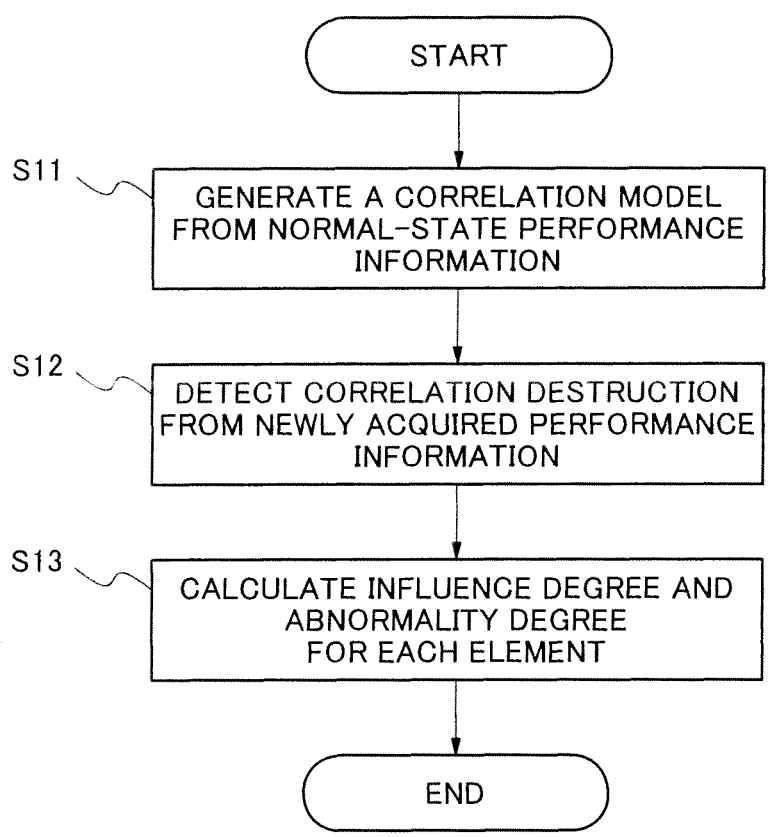

FIG. [11] A flow chart showing an example of detailed processing for correlation model generation indicated as step S11 in FIG. 10.

FIG. [12] A flow chart showing an example of a detailed processing of an analysis of correlation model variation indicated as step S12 in FIG. 10.

FIG. [13] A flow chart showing an example of a detailed processing of an analysis of propagation of correlation destruction indicated as step S13 in FIG. 10.

FIG. [14] An explanatory diagram showing an example of extent of correlations used for calculating an abnormality degree.

FIG. [15] An explanatory diagram showing an example of schematic configuration for the whole of a fault cause extraction system including the fault cause extraction apparatus according to a second exemplary embodiment of the present invention.

FIG. [16] An explanatory diagram showing configurations of the fault cause extraction apparatus and the monitored computers according to the second exemplary embodiment of the present invention.

Figure 16:
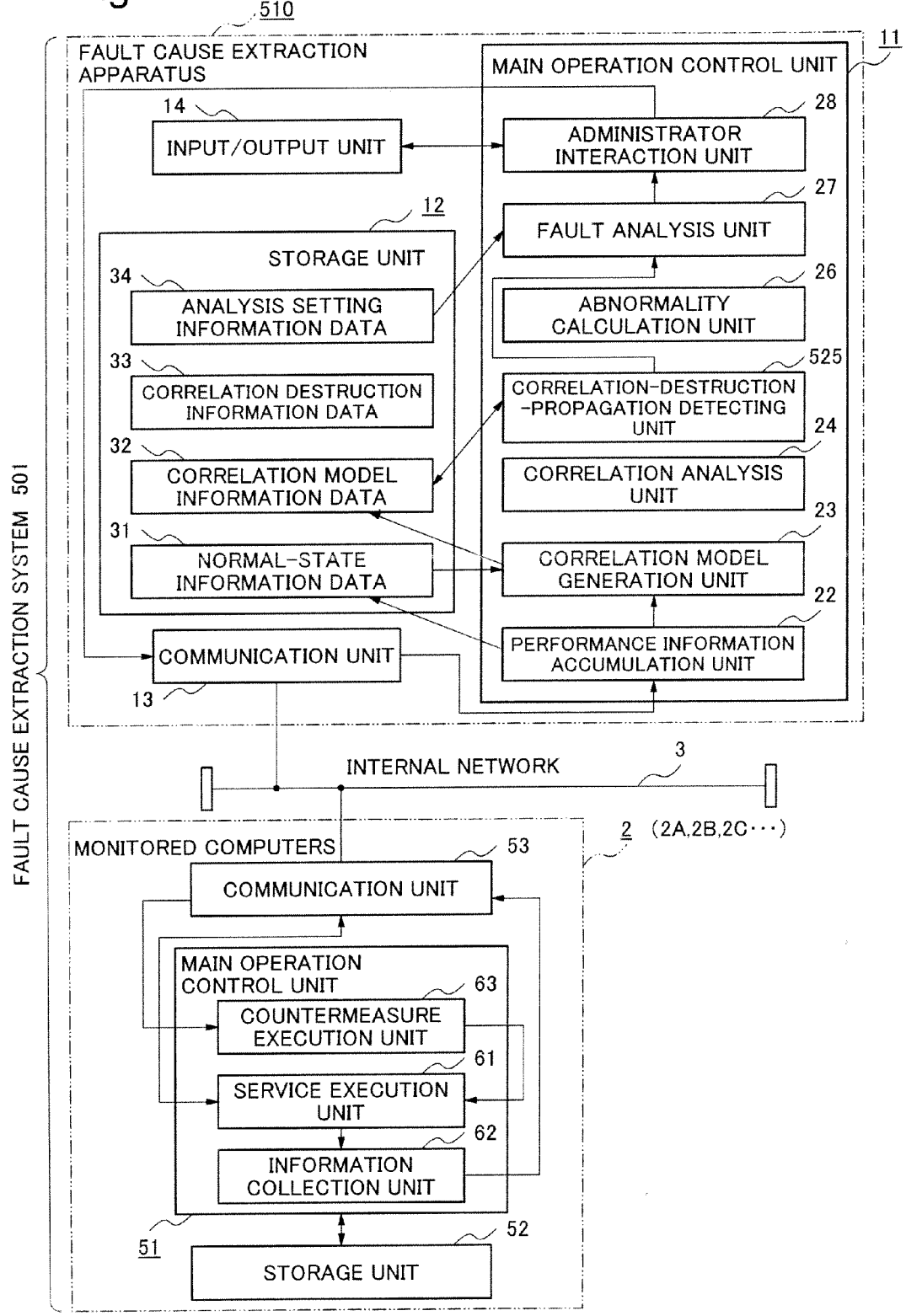

FIG. [17] An explanatory diagram showing a flow of processing performed by the fault cause extraction apparatus presented in FIG. 16.

FIG. [18] A flow chart showing an example of processing in the fault cause extraction apparatus according to the second exemplary embodiment of the present invention.

Figure 18:
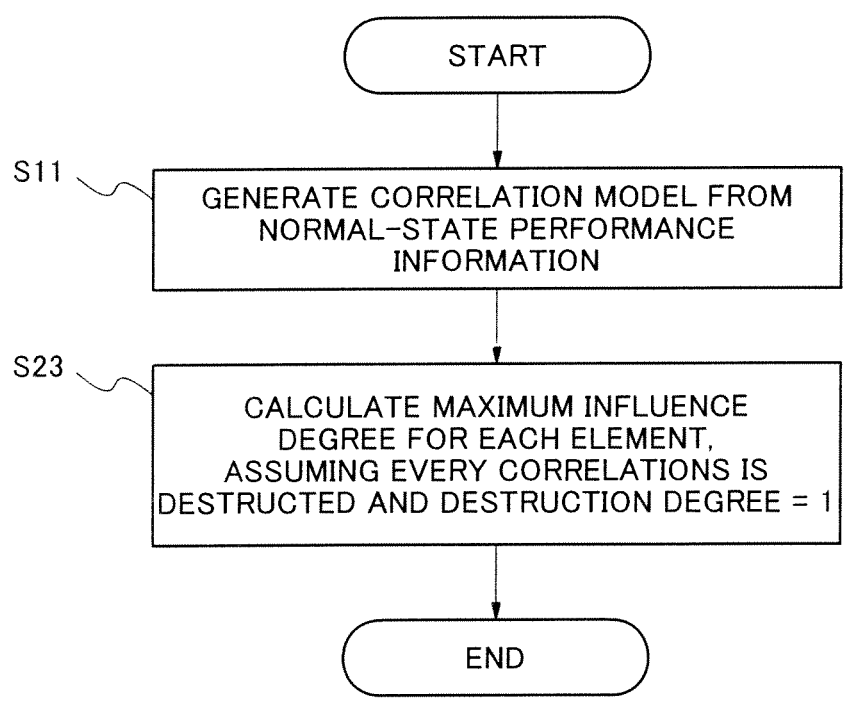

FIG. [19] A flow chart showing an example of detailed processing for an analysis of propagation of correlation destruction indicated as the step S23 in FIG. 18.

Figure 19:
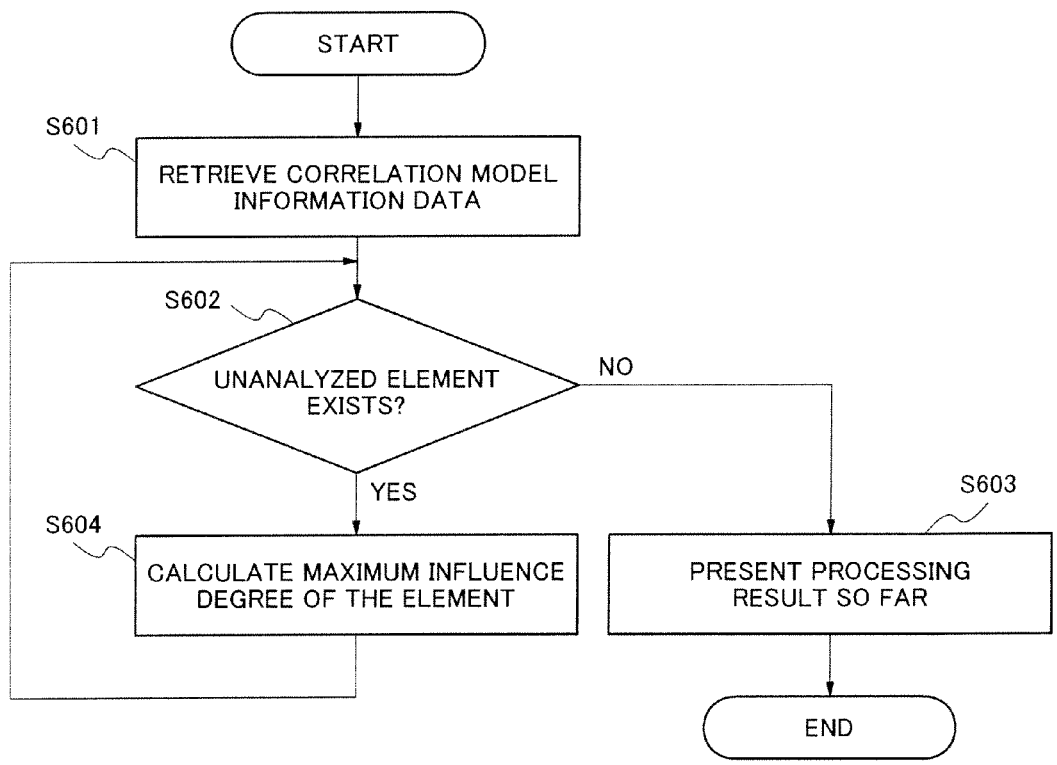

FIG. [20] An explanatory diagram showing a concept of calculation of maximum influence degree presented at step S604 in FIG. 19.

FIG. [21] A block diagram showing a characteristic configuration of the first exemplary embodiment of the present invention.

DESCRIPTION OF EMBODIMENTS (First Exemplary Embodiment)

Hereinafter, a configuration of a first exemplary embodiment of the present invention will be described based on the accompanying FIG. 1.

The basic content of the first exemplary embodiment will be described first, and more concrete content will be described after that.

A fault cause extraction apparatus 10 according to the first exemplary embodiment acquires performance information including the performance values for each of a plurality of performance items (for example, a CPU utilization rate and a memory usage) from a plurality of managed equipments (monitored computers 2A, 2B, 2C . . . ) included in the system. Here, the performance item, the managed equipment or their combination is defined as an element (a type of performance value, or simply a type). The fault cause extraction apparatus 10 analyzes the performance information, and extracts the element which may be a cause of faults among the elements.

The fault cause extraction apparatus 10 includes a performance information accumulation unit 22, a correlation model generation unit 23, a correlation analysis unit 24, a correlation-destruction-propagation detecting unit 25, an abnormality calculation unit 26 and a fault analysis unit 27.

The performance information accumulation unit 22 acquires the performance information including the performance values for each of a plurality of performance items from a plurality of managed equipments.

The correlation model generation unit 23 derives at least a correlation function between first performance series information indicating a time series variation of the performance value for a first element and second performance series information indicating a time series variation of the performance value for a second element, and generates a correlation model for the performance values of all pairs of the elements, on the basis of the correlation function.

The correlation analysis unit 24 calculates a predictive performance value for the second element, based on a performance value newly detected for the first element from the managed equipment and the corresponding correlation function, and calculates a prediction error by comparing a performance value newly detected for the second element with the predictive value. Then, the correlation analysis unit 24 analyzes whether the prediction error is within a predetermined error range, and, in case the prediction error is out of the error range, judges that the correlation between the first and the second elements is destructed.

Figure 7A:
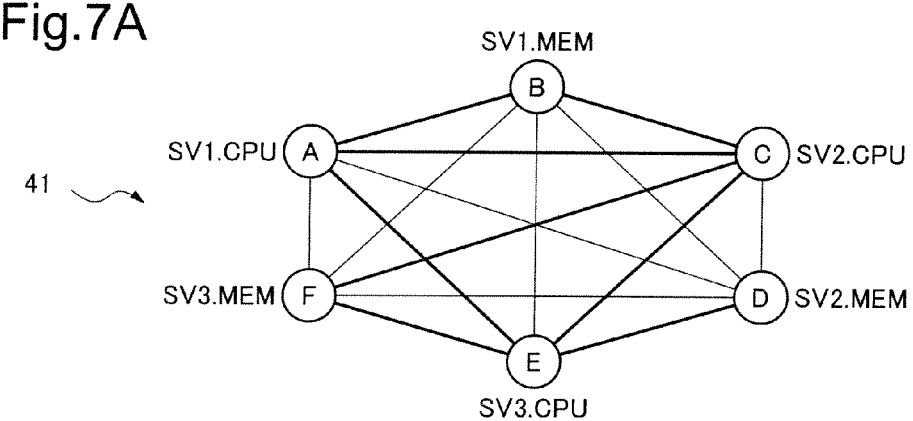

The correlation-destruction-propagation detecting unit 25 calculates, on the basis of a correlation chart (for example, 41B in FIG. 7) which represents a chain of the correlations (propagation on the correlations) with an arbitrary element of the correlation model assigned as a base point of the chain, an influence degree indicating a degree of influence which the element exerts on the system through the propagation on the correlations. For example, when the destruction of the correlation (correlation destruction) between the first and the second elements is detected, the correlation-destruction-propagation detecting unit 25 calculates a degree of the influence which the element exerts on the correlation for which the correlation destruction is detected (propagation of correlation destruction), as the influence degree. Note that the individual correlation functions which correspond to respective edges from the base point to another element on the correlation chart are defined as base point propagation functions of the base point.

The abnormality calculation unit 26 calculates an abnormality degree for an arbitrary element in the correlation model, on the basis of the influence degree calculated by the correlation-destruction-propagation detecting unit 25.

If the abnormality degree is equal to or greater than a predetermined threshold value, the fault analysis unit 27 judges that an abnormality has occurred on the element.

Furthermore, in this fault cause extraction apparatus 10, when correlation destruction is detected in a correlation, the correlation analysis unit 24 calculates a destruction degree for the correlation destruction, based on a predictive error, and the correlation-destruction-propagation detecting unit 25 calculates an influence degree utilizing the destruction degree.

Then, on a correlation chart with an arbitrary element in a correlation model assigned as a base point, the correlation-destruction-propagation detecting unit 25 calculates an influence degree (total correlation destruction propagation) of the element, by multiplying the destruction degree of correlation destruction by a damping rate, which is derived by an exponentiation of a predetermined constant, where the number of the correlations existing from the element to the correlation for which the correlation destruction is detected is regarded as an exponent, and then summing up the calculated values for a set of correlations for which the correlation destructions are detected. Further, the correlation-destruction-propagation detecting unit 25 calculates the total correlation propagation of the element, by summing up the damping rates for a set of correlations on the correlation chart. The abnormality calculation unit 26 calculates an abnormality degree for the element, by dividing the total correlation destruction propagation by the total correlation propagation.

Having such a configuration, it becomes possible for the fault cause extraction apparatus 10 to detect accurately the influence of correlation destruction on the whole network due to the propagation of correlation destruction.

Hereinafter, this will be described in more detail.

Figure 2:
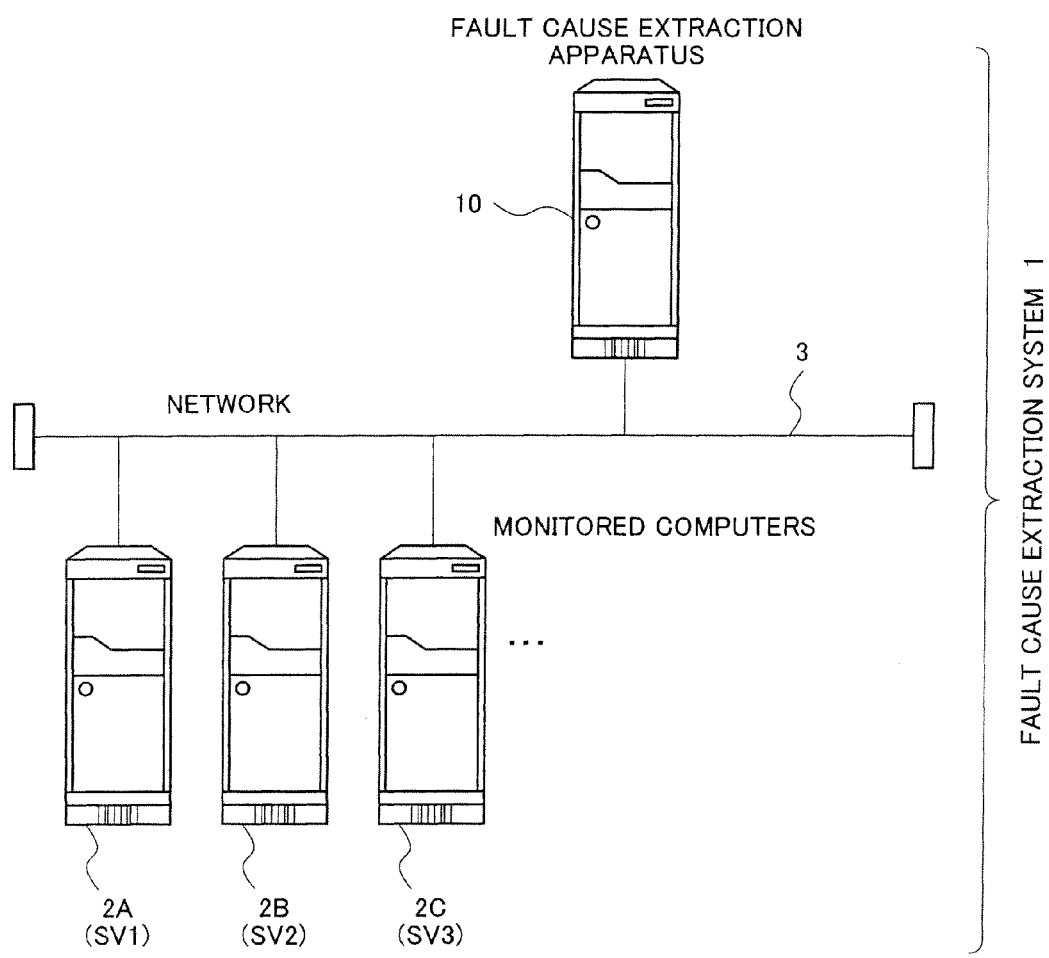

FIG. 2 is an explanatory diagram showing an example of schematic whole configuration of a fault cause extracting system 1, which includes the fault cause extracting apparatus 10, according to the first exemplary embodiment of the present invention.

The fault cause extraction system 10 acquires performance information including performance values for each of a plurality of performance items (for example, a CPU utilization rate and a memory usage) from the monitored computers 2A, 2B, 2C . . . , and, on the basis of this performance information, performs the operations described below.

FIG. 1 is an explanatory diagram showing configurations of the fault cause extraction apparatus 10 and the monitored computers 2, both according to the first exemplary embodiment of the present invention. As the monitored computers 2A, 2B, 2C, . . . shown in FIG. 2 have an identical configuration with each other, these computers are collectively named as monitored computers 2 in FIG. 1 omitting detail descriptions. FIG. 3 is an explanatory diagram showing a flow of the processing performed by the fault cause extraction apparatus 10 presented in FIG. 1.

The fault cause extraction apparatus 10 according to the first exemplary embodiment of the present invention is a general computer system, for example, and includes a main operation control unit (CPU: Central Processing Unit) 11 which works as a core in the execution of a computer program, a storage unit 12 which stores data, a communication unit 13 that performs data communication with other computers via a network 3, and an input/output unit 14 which accepts operations by the user (a network administrator, in this case) and presents the results of processing.

In the main operation control unit 11 of the fault cause extraction apparatus 10, each of the performance information accumulation unit 22, the correlation model generation unit 23, the correlation analysis unit 24, the correlation-destruction-propagation detecting unit 25, the abnormality calculation unit 26, the fault analysis unit 27 and an administrator interaction unit 28 operates in a form of a computer program. Further, each of normal-state performance information data 31, correlation model information data 32, correlation destruction information data 33 and analysis setting information data 34 is stored in the storage unit 12.

The monitored computers 2 also include a main operation control unit 51, a storage unit 52 and a communication unit 53, as the fault cause extraction apparatus 10 does. While the functions of these units in the computers 2 are identical with that of the main operation control unit 11, the storage unit 12 and the communication unit 13 in the fault cause extraction apparatus 10, respectively, each of a service execution unit 61, an information collection unit 62 and a countermeasure execution unit 63, in the main operation control unit 51 of the monitored computers 2, operates in a form of a computer program.

The service execution unit 61 of the monitored computers 2 provides information and communications services such as web services and business services. The information collection unit 62 detects an operating state of the service execution unit 61, acquires performance information included in the operating state and sends the information to the performance information accumulation unit 22 of the fault cause extraction apparatus 10. The performance information accumulation unit 22 of the fault cause extraction apparatus 10 receives the performance information from the information collection unit 62 of each of the monitored computers 2, and stores the information as normal-state performance information data 31.

The correlation model generation unit 23 takes the performance information with regard to a certain period of time, from the normal-state performance information data 31, and, with regard to the time series of two arbitrary types of performance values, derives a transform function (correlation function) for the case where one of the two time series is regarded as an input and the other as an output. The correlation model generation unit 23 compares a series of performance values generated by this correlation function with a series of actually detected values, and calculates weight information of the correlation function from the difference between the two series of values. Furthermore, by repeating these processes on every pair of the types, the correlation model generation unit 23 generates a correlation model for the overall operating state of the service execution units 61. Simultaneously, the correlation model generation unit 23 stores the generated correlation model as correlation model information data 32.

The correlation analysis unit 24 receives newly detected performance information from the performance information accumulation unit 22, and analyzes whether the performance values included in the received performance information satisfy the relationship represented by the correlation functions between the performance values, which is stored in the correlation model information data 32, within a certain error range, and outputs the results of the analysis.

The correlation analysis unit 24 calculates a predictive performance value for the second element, based on a performance value newly detected for the first element and a corresponding correlation function, and then calculates a prediction error by comparing a performance value newly detected for the second element with the predictive performance information, and analyzes whether the prediction error is within a predetermined error range. Further, if the prediction error is out of the predetermined error range, the correlation analysis unit 24 judges that the correlation between the first and second elements is destructed, calculates a destruction degree of the correlation destruction between the elements, and stores this destruction degree value as correlation destruction information data 33.

The fault analysis unit 27 receives the operating state information collected by the performance information accumulation unit 22 and the result of analysis performed by the correlation analysis unit 24, and performs a fault analysis according to the contents of analysis setting stored in advance in the analysis setting information data 34.

The administrator interaction unit 28 receives a result of the fault analysis from the fault analysis unit 27 and presents it to an administrator via the input/output unit 14. Then, the administrator interaction unit 28 receives an operational input made by the administrator and, according to this operational input, orders the countermeasure executing unit 63 of the monitored computer 2 to take countermeasures. The countermeasure executing unit 63 executes a process for the countermeasures against the faults on the service executing unit 61, in response to the order from the administrator interaction unit 28.

While the above-mentioned configuration is the same as that of a fault cause extraction apparatus described in Japanese Patent Application Laid-Open No. 2009-199533, the fault cause extraction apparatus according to the first exemplary embodiment of the present invention additionally includes the correlation-destruction-propagation detecting unit 25 and the abnormality calculation unit 26.

When correlation destruction between the elements is detected, the correlation-destruction-propagation detecting unit 25 calculates an influence degree for each element in the correlation model, on the basis of the correlation model information data 32 and the correlation destruction information data 33.

The abnormality calculation unit 26 calculates an abnormality degree for each element in the correlation model, on the basis of the influence degrees calculated by the correlation-destruction-propagation detecting unit 25.

These steps of processing by the correlation-destruction-propagation detecting unit 25 and the abnormality calculation unit 26 will be described later in detail.

The fault analysis unit 27 performs a fault analysis with regard to the abnormality degree calculated by the abnormality calculation unit 26, in accordance with an analysis setting stored in the analysis setting information data 34. In the analysis setting information data 34, it is defined, for example, to present a warning message to the administrator in case the abnormality degree is equal to or greater than a predetermined threshold value. In accordance with this, the fault analysis unit 27 judges whether the load of a specific computer is high or not, from the performance information detected by the performance information accumulation unit 22, using the threshold value. Here, the applied threshold value is stored in advance in the analysis setting information data 34. Furthermore, in the analysis setting information data 34, a threshold value different from that for the others may be defined for a specific information item or a specific one of the monitored computers 2.

The administrator interaction unit 28 presents the results of such a fault analysis to the administrator via the input/output unit 14. When an input for ordering some kind of countermeasure is made by an administrator via the input/output unit 14, the administrator interaction unit 28 sends the contents of this input to the countermeasure executing unit 63 and orders to execute the countermeasure. For example, when an abnormality occurs in the CPU utilization rate or the memory usage for a specific one of the monitored computers 2, the administrator can order a countermeasure such as to reduce the amount of operations ordered to that one of the monitored computers 2 and then to move those operations to another one of the monitored computers 2.

After that, if no correlation destruction is detected in the performance information collected at a constant time interval by the performance information accumulation unit 22, the fault analysis unit 27 judges that it is recovered from the fault, and this result is presented to the administrator via the administrator interaction unit 28. By repeating these processes of collecting information, analyses and countermeasures, the measures against the faults on the service execution unit 61 are performed continually.

(Generation of Correlation Model and Detection of Correlation Destruction)

FIG. 4 is an explanatory diagram showing an example of normal-state performance information data 31 which is accumulated in the performance information accumulation unit 22 shown in FIGS. 1 and 3. The information collection unit 62 of the monitored computer 2 detects an operating state of the service execution unit 61, extracts the performance information from the operating state, and sends the information to the performance information accumulation unit 22 of the fault cause extraction apparatus 10.

The normal-state performance information data 31 is a list of the performance information for the service execution unit 61, which is collected successively by the information collection unit 62. Each piece of performance information includes a plurality of items of performance values measured at the same time by each of the monitored computers 2 presented in FIG. 2, and is listed at a predetermined time interval. For example, when web services are executed at the service execution unit 61, the information collection unit 62 detects CPU utilization rates and remaining memory sizes for each of the monitored computers 2 providing the web services, and sends the information to the performance information accumulation unit 22 of the fault cause extraction apparatus 10. The performance information accumulation unit 22 records and accumulates this information as the normal-state performance information data 31.

FIG. 4 indicates an example of thus accumulated normal-state performance information data 31. Here, the monitored computers 2 shown in FIG. 2 are designated individually as monitored computers 2A, 2B, 2C, . . . , and the names for the monitored computers 2A, 2B, 2C, . . . are "SV1", "SV2", "SV3", . . . , respectively.

For example, the type "SV1.CPU" indicates the CPU utilization rate for the monitored computer 2A (SV1), and it can be seen that the performance value for "SV1.CPU" measured at 17:25 of Jan. 5, 2007 is "12" and that the performance values measured subsequently at an interval of one minute are, in the order from 17:26, "15", "34", "63", . . . , respectively. Similarly, the type "SV1.MEM" indicates the memory usage for the monitored computer 2A (SV1), and the performance values of "SV1.CPU" measured at the same times as that for "SV1.CPU" are presented. The type "SV2.CPU" indicates the CPU utilization rate for the monitored computer 2B (SV2), and the performance values of "SV2.CPU" measured at the same times as that for the other performance values are presented.

Figure 5:
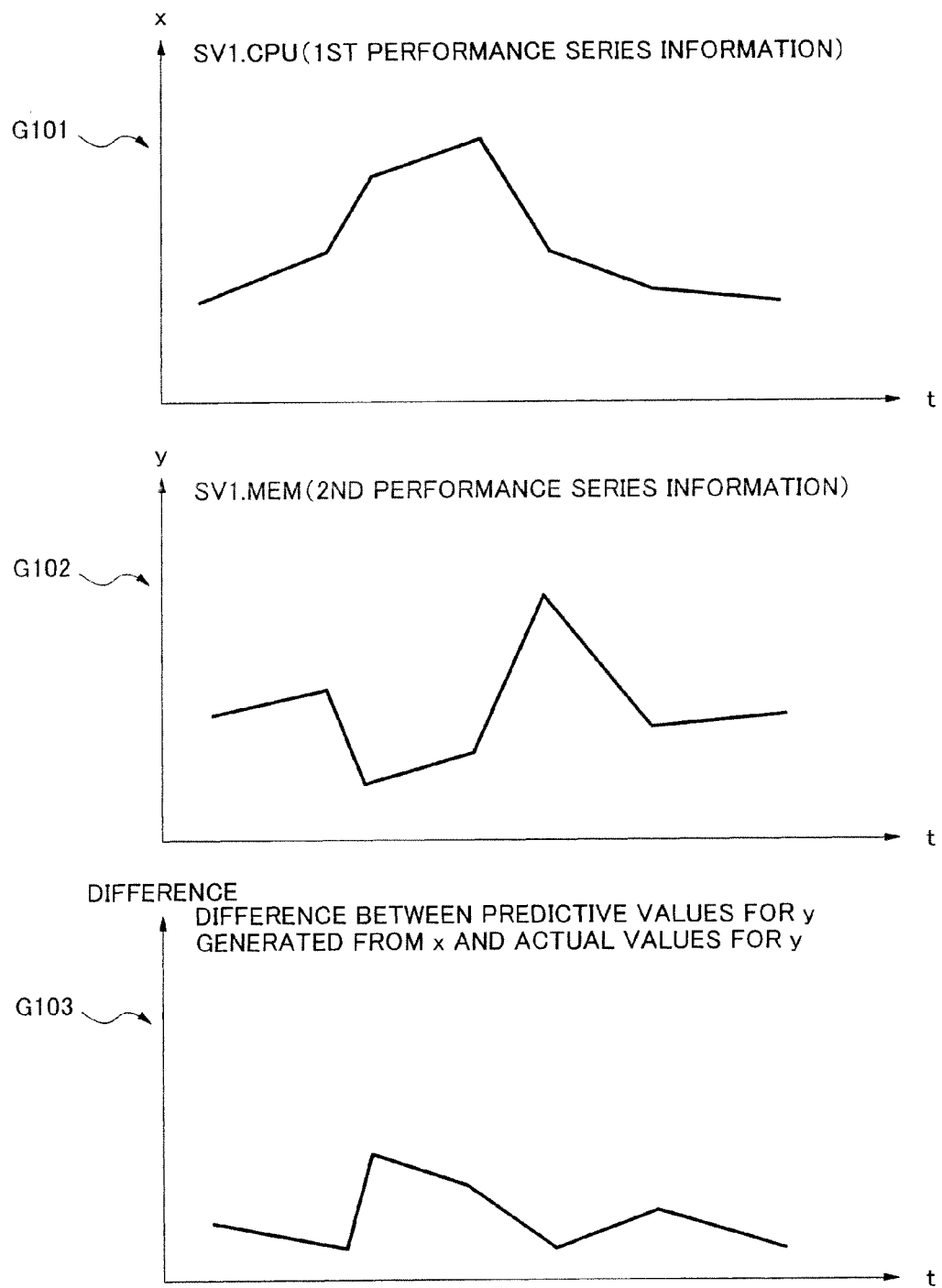

The correlation model generation unit 23 performs a process of correlation model generation as shown below, with regard to each type of performance values in thus accumulated normal-state performance information data 31. FIG. 5 is an explanatory diagram showing an example of a correlation model generation process with regard to the normal-state performance information data 31 presented in FIG. 4. The graph G101 shows a relation between t and x, where x represents a performance value of the type "SV1.CPU" against the time t. The graph G102 shows a relation between t and y, where y represents a performance value of the type "SV1.MEM" against the time t. The graphs G101 and G102 present "first performance series information" and "second performance series information", respectively.

Here, the correlation model generation unit 23 approximates the relation between x and y with a predetermined approximate equation "$y=f(x)=Ax+B$" (A and B are constants), for example, and calculates the values for the coefficients as "$A=-0.6$" and "$B=100$". The correlation model generation unit 23 calculates a difference, which is shown in the graph G103, between a series of predictive performance values for the type "SV1.MEM" which is generated from a series of actual performance values for the type "SV1.CPU" presented in the graph G101 by using the above correlation function, and a series of actual performance values for "SV1.MEM" presented in the graph G102. Then, the correlation model generation unit 23 calculates a weight value, which decreases in accordance with the average of the differences and takes a maximum value of 1, as "$w=0.88$" in this case, for example. The approximate equation is not limited to such linear functions, but any kinds of functions can be used as long as an effective approximation is achieved.

If a value of the weight w is equal to or greater than a specific threshold value, the correlation model generation unit 23 judges that the correlation between x and y is "valid". For example, if the threshold value is set to be 0.5, the correlation between x and y, that is, between "SV1.CPU" and "SV1.MEM", is judged as "valid".

FIG. 6 is an explanatory diagram showing an example of the correlation model information data 32 generated from the normal-state performance information data 31 by the correlation model generation unit 23. The correlation model information data 32 includes, for every pair of the types recorded as above in the normal-state performance information data 31, the names of the types regarded as an input and an output of the correlation function, respectively, each value of the coefficients and weights specifying the correlation function, and correlation judgment information (validity) indicating whether the corresponding correlation is valid or not.

For example, with regard to the correlation between "SV1.CPU" and "SV1.MEM" presented in FIG. 5, a correlation with a coefficient A value of "−0.6", a coefficient B value of "100" and an weight value of "0.88" in the equation "y=Ax+B", with "SV1.MEM" regarded as the output, is stored in the correlation model information data 32. The correlation model generation unit 23 performs such an analysis on every pair of the types in the normal-state performance information data 31 accumulated by the performance information accumulation unit 22.

The correlation analysis unit 24 judges, for every pair of the types, whether the weight w is equal to or greater than a specific threshold value, that is, whether the correlation is valid or not, and sets "O", if the correlation is judged as valid, or "X", if judged as invalid, in the correlation judgment information (validity) of the correlation model information data 32.

Figure 7B:
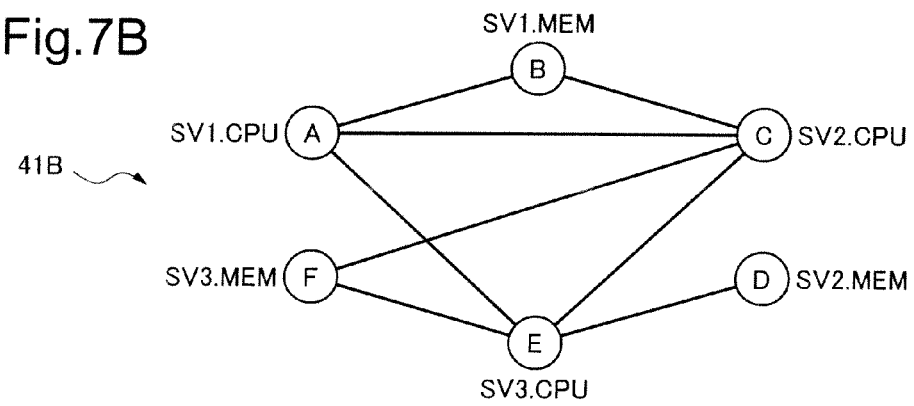
Figure 7C:
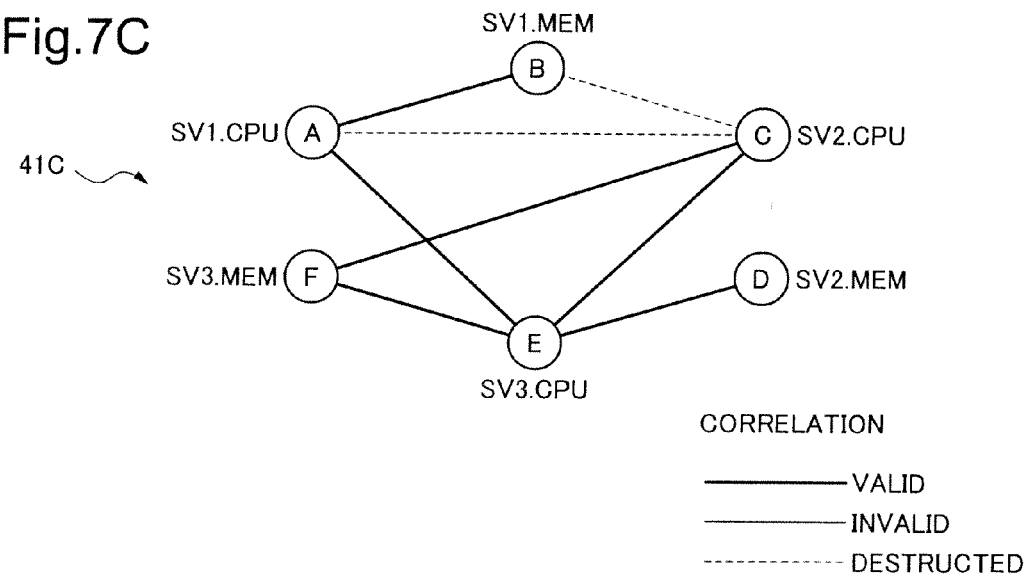

FIG. 7 is an explanatory diagram showing examples of a correlation chart 41 which can be drawn based on the correlation model information data 32 presented in FIG. 6. The correlation analysis unit 24 additionally has a function to draw such a correlation chart 41, in response to an instruction inputted from an operator, and to output the chart via the administrator interaction unit 28. In the example shown in FIG. 7, each of the CPU utilization rates and memory usages for three monitored computers 2A, 2B and 2C are represented by the elements from A to F on the correlation chart 41.

The CPU utilization rates and memory usages for the monitored computers are "SV1.CPU" and "SV1.MEM" for 2A, "SV2.CPU" and "SV2.MEM" for 2B, and "SV3.CPU" and "SV3.MEM" for 2C, respectively.

For example, the element A represents "SV1.CPU", that is, the CPU utilization rate for the monitored computer 2A. Similarly, the element F represents "SV3.MEM", that is, the memory usage for the monitored computer 2C Then, the edges connecting respective elements with each other represent the correlations from one element to the other, which are represented by the correlation functions in the correlation model. The respective correlations are presented with a thick line when the weight w, which is defined in the range from 0 to 1, is equal to or greater than 0.5, and with a thin line when w is smaller than 0.5. The correlation chart 41 in FIG. 7 indicates the states of correlations by the line thickness in accordance with the weight w, in this manner.

For example, the correlation between the elements A and B is expressed by a thick line, which indicates that the weight w for the correlation from the element A to the element B is equal to or greater than 0.5. Further, the correlation between the elements A and F is expressed by a thin line, which indicates that the weight w for the correlation from the element A to the element F is smaller than 0.5. As the weight w is calculated based on the error of the correlation function, this line thickness represents the strength of the correlation.

The correlation model generation unit 23 can obtain a correlation chart such as 41B, for example, by extracting only stable correlations (thick lines) having the weight values equal to or greater than 0.5 from the correlation chart 41. The correlation model generation unit 23 generates this correlation model information data 32, on the basis of the performance information acquired while the whole of the fault cause extraction system 1 is operating stably and normally.

Then, the correlation analysis unit 24 performs the above-described correlation analysis on newly acquired performance information. Then, there may be a case in which a correlation which was valid ("O"), while the whole of the fault cause extraction system 1 was operating normally, changes into invalid ("X") as time goes on. This is the "correlation destruction" defined in the present exemplary embodiment, and implies that any kind of change has occurred clearly in the operating state of the fault cause extraction system 1.

The correlation chart 41C in FIG. 7 indicates a correlation which has been put into destruction as time went on in such a way, by a broken line. In the correlation chart 41C, the correlation between the elements A and C and that between the elements B and C are in destruction, compared to the correlation chart 41B for normal state operation. The correlation analysis unit 24 compares newly acquired performance information with the correlation model information data 32, and calculates a "destruction degree" representing a degree of the error in a transformation between the performance values, and then stores it as correlation destruction information data 33.

Here, the correlation analysis unit 24 may define the destruction degree as a proportion to a predetermined maximum error, setting 1 as the maximum value of the proportion. In this case, the predetermined maximum error is provided by an administrator, for example, as a predictive maximum value of the transformation error.

FIG. 8 is an explanatory diagram showing an example of the correlation destruction information data 33 presented in FIGS. 1 and 3. The correlation destruction information data 33 includes the destruction degrees each calculated with regard to the respective correlations for which correlation destruction is detected.

(Calculation of Correlation Destruction Propagation)

Figure 9:
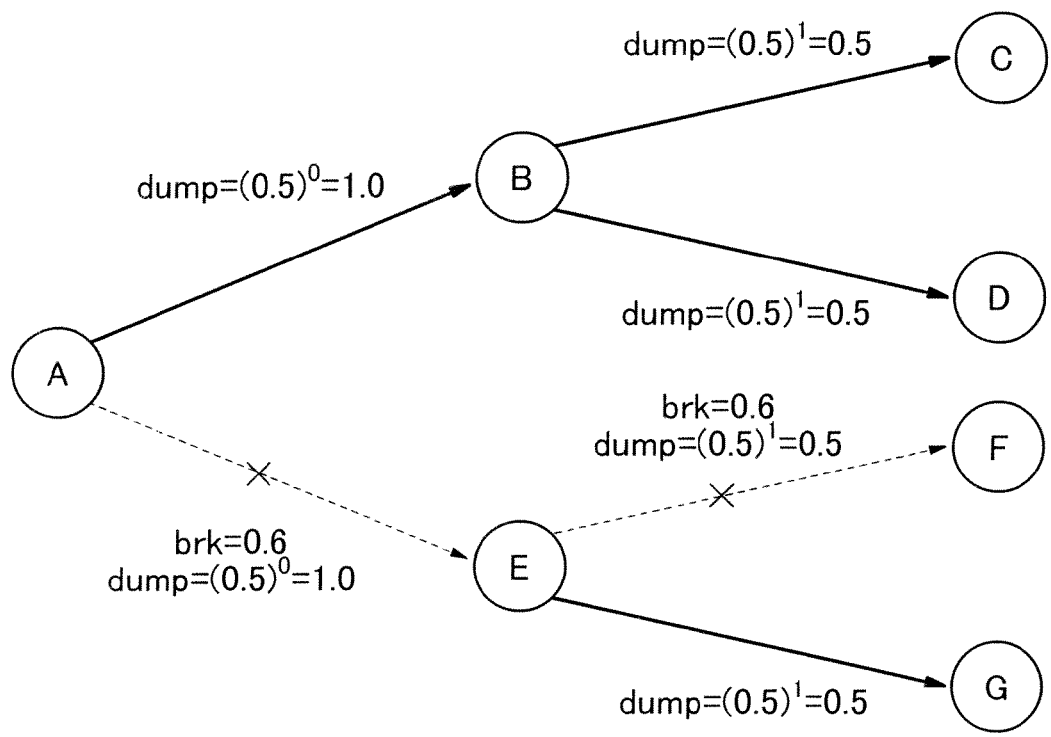

FIG. 9 is an explanatory diagram showing an example of calculation of the propagation of the correlation destruction performed by the correlation-destruction-propagation detecting unit 25 and the abnormality calculation unit 26. When the above-described correlation destruction is detected by the correlation analysis unit 24, the correlation-destruction-propagation detecting unit 25 calculates an influence degree (total correlation destruction propagation) for each element on the correlation chart.

Concerning the example shown in FIG. 9, it is assumed that, in the fault cause extraction system with the seven elements from A to G, the correlation for A-B (defined as that input is the element A and output is the element B, and the same definition is applied hereinafter) and that for A-E, B-C, B-D, E-F and E-G are valid in the normal state, but the correlation destruction has been detected for A-E and E-F by the correlation analysis unit 24.

Further, in the example shown in FIG. 9, the element A has exerted an influence on a correlation related to another element through the propagation on the correlations expressed in the correlation chart with the element A regarded as the base point, and the resultant correlation destruction has been detected. Here, if the destruction degree of the correlation i is expressed as brk(i), the number of correlations from the element A to the correlation i as hop(i), and the damping rate of the correlation as dump(i), the total correlation destruction propagation F (influence degree), total correlation propagation G and abnormality degree eval with regard to the base point element of the correlation chart are calculated by the expressions 1 shown in the following. Here, n is the set of the correlations for which correlation destructions are detected on the correlation chart, and m is the set of the correlations on the correlation chart.

$$f_i = \text{dump}(\text{hop}(i)) \times \text{brk}(i) \quad (1)$$

$$g_i = \text{dump}(\text{hop}(i))$$

$$F = \sum_{i \in n} f_i$$

-continued $$G = \sum_{i \in m} g_i$$

$$eval = \frac{F}{G} = \frac{\sum_{i \in n} f_i}{\sum_{i \in m} g_i}$$

In the example in FIG. 9, if the destruction degree is defined as brk=0.6 with regard to the correlations for A-E and E-F and the damping rate is defined as dump(i)=0.5^(hop(i)−1), the total correlation destruction propagation F, total correlation propagation G and abnormality degree are calculated as in the expressions 2 shown below. In this example, the correlations for A-E and E-F correspond to the set n, and whole correlations including all other correlations in addition to n correspond to the set m. Further, hop(i)=1 with regard to the correlations for A-B and A-E, and hop(i)=2 with regard to that for B-C, B-D, E-F and E-G. In FIG. 9, the correlations for which correlation destruction was detected are expressed by broken lines, and the others are expressed by solid lines.

$$dump(i) = 0.5^{(hop(i)-1)} \quad (2)$$

$$G = \sum_{i \in m} g_i = \overset{A-B}{1.0} + \overset{B-C}{0.5} + \overset{B-D}{0.5} + \overset{A-E}{1.0} + \overset{E-F}{0.5} + \overset{E-G}{0.5} = 4.0$$

$$F = \sum_{i \in n} f_i = 1.0 \overset{A-E}{\times} 0.6 + 0.5 \overset{E-F}{\times} 0.6 = 0.9$$

$$eval = \frac{0.9}{4.0} = 0.225$$

In Expressions 2, the first and the second terms of the right side in the expression for the total correlation destruction propagation F indicate the correlation destruction propagation with regard to the correlation for A-E and that with regard to the correlation for E-F, respectively. Further, the first to sixth terms of the right side in the expression for the total correlation propagation G indicate the damping rates for A-B, B-C, B-D, A-E, E-F and E-G, respectively.

The correlation-destruction-propagation detecting unit 25 and the abnormality calculation unit 26 perform similar calculations on every element regarding each as a base point. If the abnormality degree eval calculated regarding an element as a base point exceeds a predetermined to threshold value, the fault analysis unit 27 judges that an abnormality has occurred on the element and presents the result to an administrator via the administrator interaction unit 28.

(Flow of Processing)

FIG. 10 is a flow chart showing an example of the processing in the fault cause extraction apparatus 10 according to the first exemplary embodiment of the present invention. In this embodiment, with regard to one or a plurality of performance items acquired from a plurality of monitored computers 2 included in the fault cause extraction system 1, the performance item, the monitored equipment or their combination is regarded as the element. The correlation model generation unit 23 generates a correlation model, on the basis of the performance information acquired while the whole of the fault cause extraction system 1 is operating stably and normally, between the performance series each indicating a time series variation of the performance values of each element, which is included in the performance information (step S11).

Subsequently, the correlation analysis unit 24 substitutes newly detected and acquired performance information into the correlation model to detect correlation destruction (step S12). Then, with regard to the detected correlation destruction, the correlation-destruction-propagation detecting unit 25 calculates an influence degree for each element, and the abnormality calculation unit 26 calculates an abnormality degree of the base point (step S13). The steps S11 and S12 are the same operations as that for the fault cause extraction apparatus described in Japanese Patent Application Laid-Open No. 2009-199533. The step S13 is an operation peculiar to the fault cause extraction apparatus according to the present invention.

Figure 11:
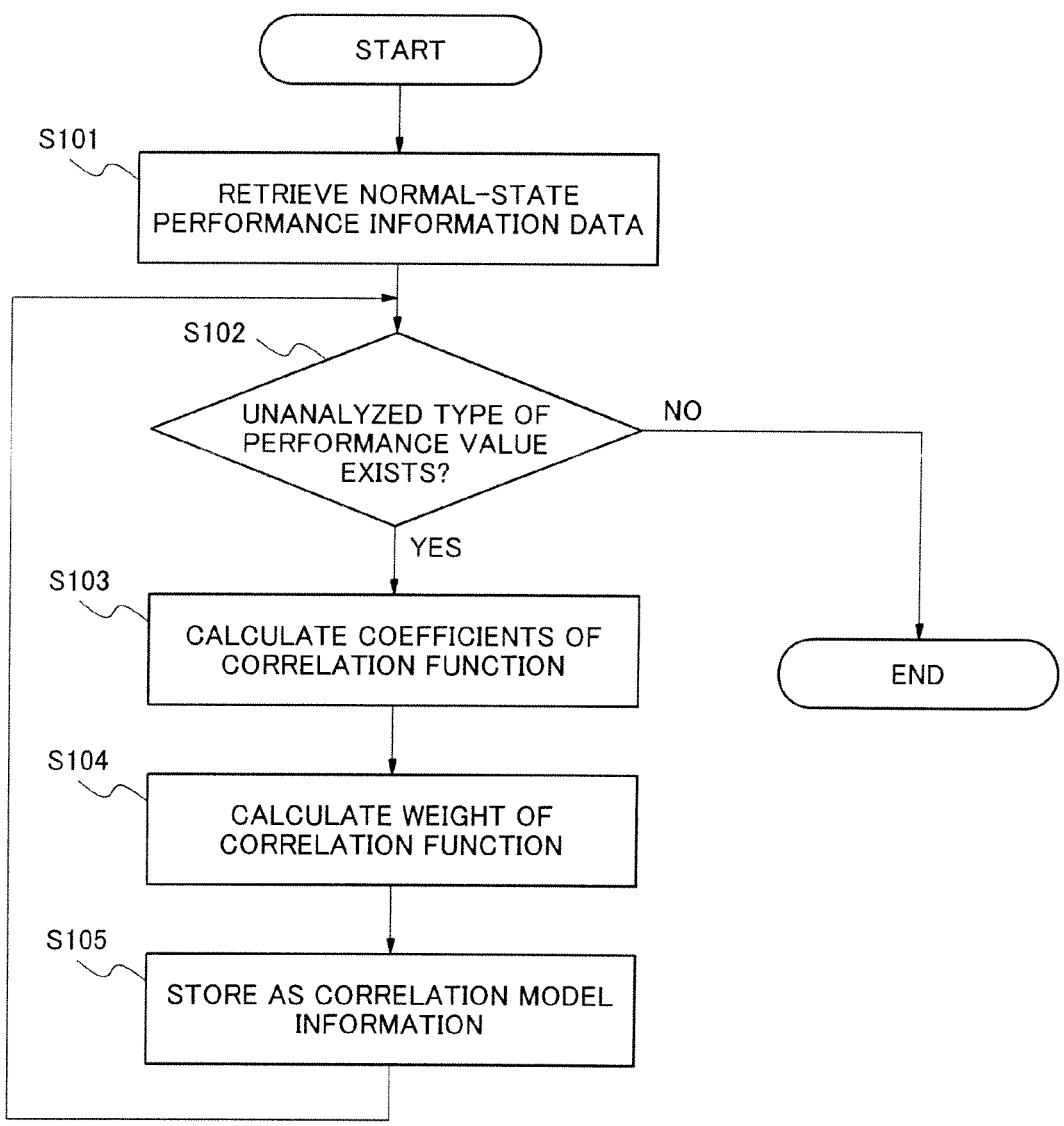

FIG. 11 is a flow chart showing an example of detailed processing for the correlation model generation indicated as the step S11 in FIG. 10. While the whole of the fault cause extraction system 1 is operating stably and normally, the information collection unit 62 of the monitored computers 2 detects the operating state of the service execution unit 61, and sends the performance information included in the operating state to the performance information accumulation unit 22 of the fault cause extraction apparatus 10. The performance information accumulation unit 22 stores the performance information as the normal-state performance information data 31.

The correlation model generation unit 23 acquires this normal-state performance information data 31 (step S101), and judges whether an unanalyzed type of perform value remains or not (step S102). If no unanalyzed type is remained (step S102/NO), the correlation model generation unit 23 ends the processing.

If any unanalyzed type remains (step S102/YES), the correlation model generation unit 23 starts the processing for calculating the coefficients of correlation functions between the types of performance value and so on. As in the processing, already described above, for calculating the correlation function between the series of performance values for the types "SV1.CPU" and "SV1.MEM" shown in FIGS. 4 and 5, the correlation model generation unit 23 calculates the coefficients and so on of the correlation functions with regard to the correlations between the unanalyzed types. For example, when approximation is made with a correlation function expressed as "y=Ax+B", the correlation model generation unit 23 calculates the coefficients A and B (step S103).

Furthermore, following this, the correlation model generation unit 23 calculates also a weight w of the correlation function (step S104). Then, the correlation model generation unit 23 stores the calculated coefficients and weight as the correlation model information data 32 (step S105). The correlation model generation unit 23 repeats these processes shown in the steps from S103 to 105 on every pair of the types of performance value, and thereby generates the correlation model information data 32 with regard to the whole of the fault cause extraction system 1.

Figure 12:
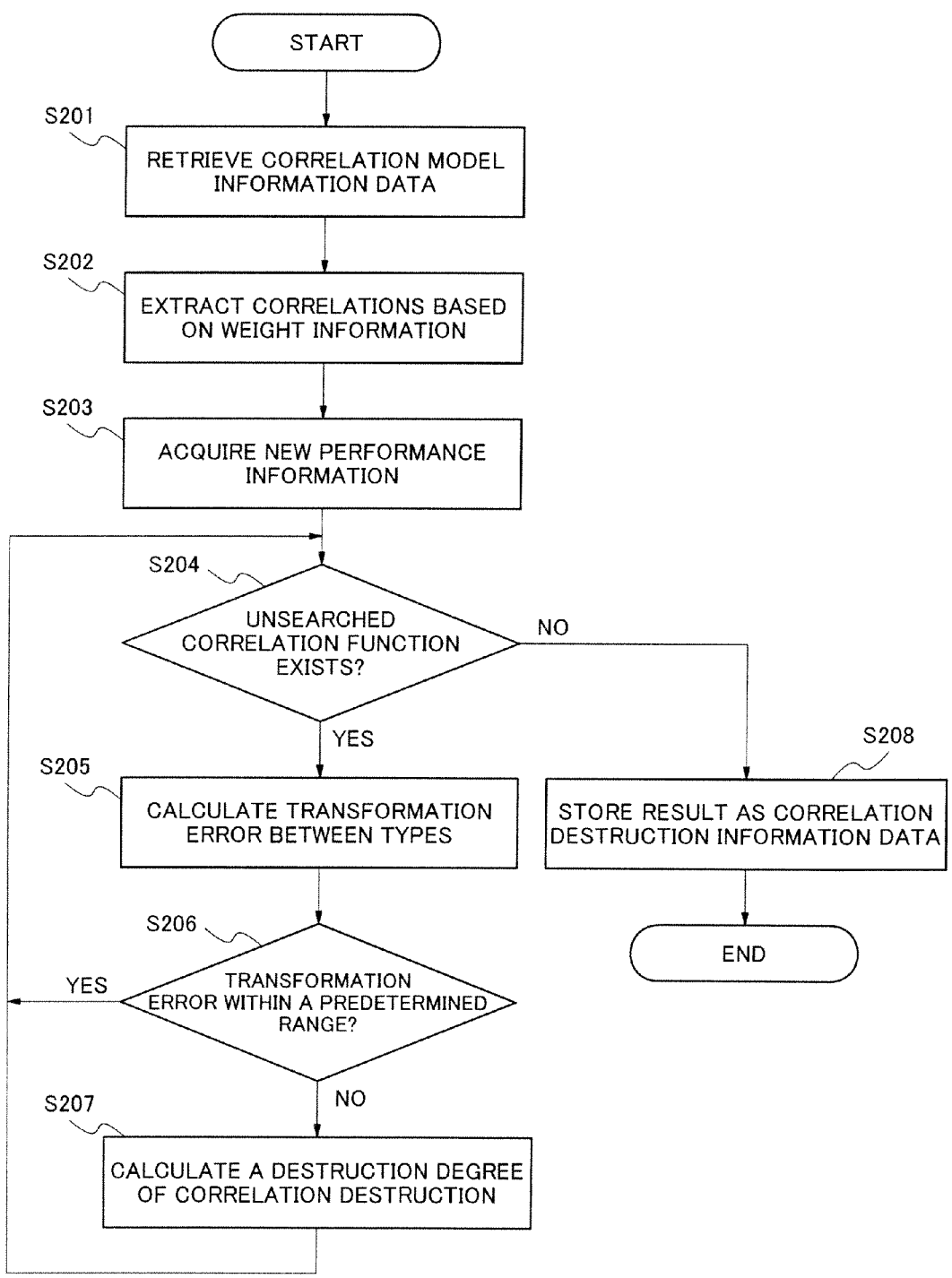

FIG. 12 is a flow chart showing an example of detailed processing of an analysis of correlation model variation indicated as the step S12 in FIG. 10. The correlation analysis unit 24 retrieves the correlation model information data 32 generated by the processing shown in FIG. 11 (step S201), and extracts the correlations based on the weight information included there (step S202). This processing corresponds to that to obtain the correlation chart 41B, by extracting only the thick lines indicating stable correlations with a weight value of equal to or greater than 0.5, from the correlation chart 41 shown in FIG. 7(a), where the correlations are drawn with different line thicknesses depending on the weight w of the correlation model.

Subsequently, the correlation analysis unit 24 acquires the performance information sent from the information collection unit 62 of the monitored computers 2 via the performance information accumulation unit 22 (step S203). For example, when the acquired performance information is that at the time "2010/1/07 8:30" shown in the most bottom line of the normal-state performance information 31 presented in FIG. 4, the correlation analysis unit 24 searches the correlation functions stored as the correlation model information data 32 successively, and judges whether any unsearched correlation function remains or not (Step S204). If no unsearched correlation function remains (step S204/NO), the correlation analysis unit 24 stores the processing result so far as the correlation destruction information data 33 (step S208) and ends the processing.

If any correlation function remains (step S204/YES), the correlation analysis unit 24 compares newly acquired performance information with the correlation model information data 32, and calculates a transformation error between the types of performance value (step S205). For example, when the acquired performance information presents the values "20" and "79" for "SV1.CPU" and "SV1.MEM", respectively, the correlation analysis unit 24 derives a predictive value as $(-0.6)*(20)+100$="88" by substituting the performance value "20" of "SV1.CPU" into the approximate equation recorded in the correlation model information data 32, and compares this predictive value with the measured value "79" to obtain an error value "9".

Subsequently, the correlation analysis unit 24 calculates a proportion of this error to the detected value, and judges whether this proportion value is within a predetermined range or not (step S206). If the value is within the predetermined range (step S206/YES), the correlation analysis unit 24 judges that no particular abnormality has occurred, and returns to the processing of the step S204. If it is beyond the predetermined range (step S206/NO), the correlation analysis unit 24 judges that the correlation is destructed, calculates a destruction degree of the correlation destruction from this transformation error and records the result as the correlation destruction information data 33 (step S207).

Figure 13:
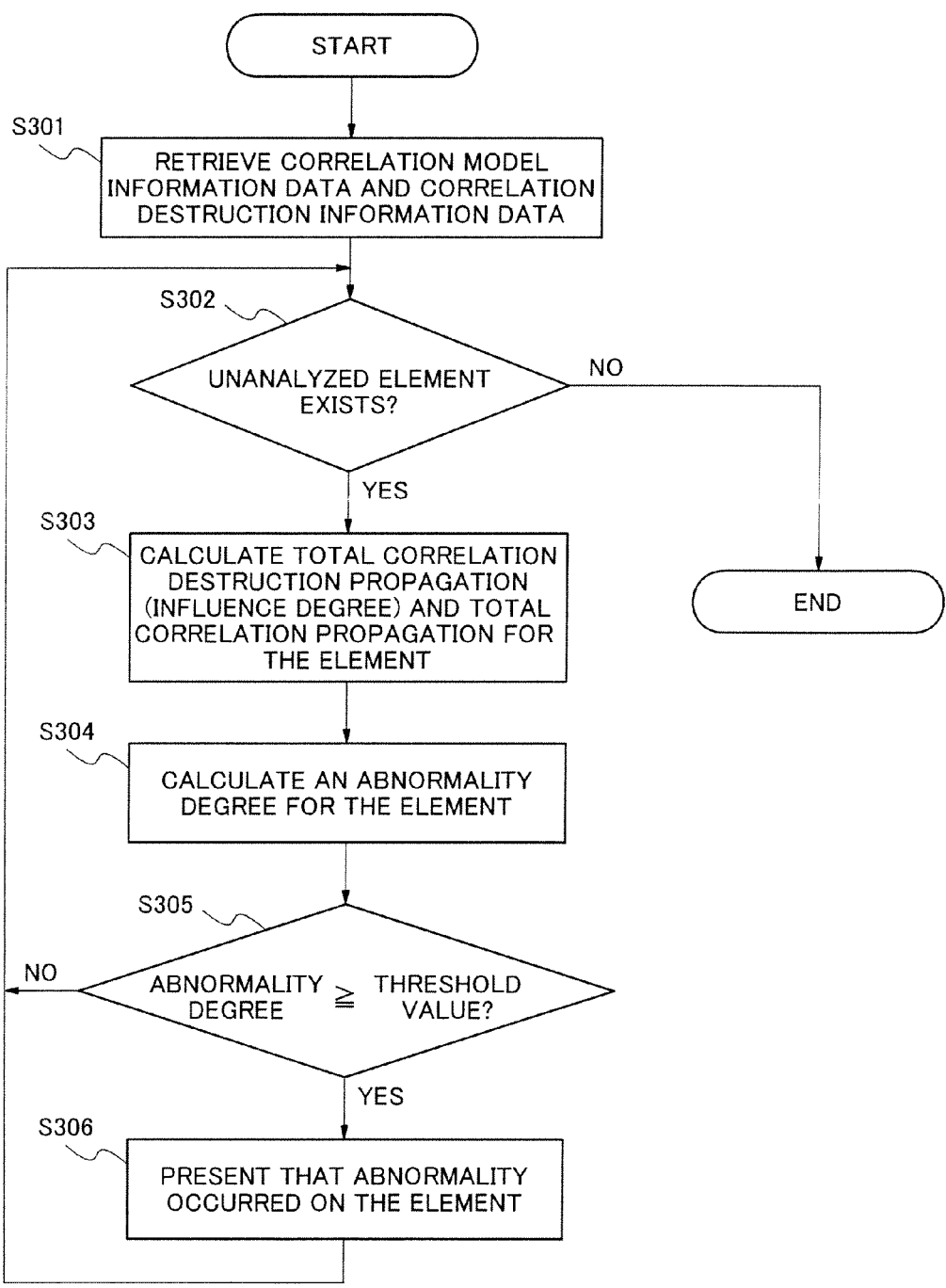

FIG. 13 is a flow chart showing an example of the detailed processing of an analysis of the propagation of correlation destruction indicated as the step S13 in FIG. 10. The correlation-destruction-propagation detecting unit 25 firstly retrieves the correlation model information data 32 and the correlation destruction information data 33 (step S301), and judges whether any unanalyzed element remains or not (step S302). If no unanalyzed element remains (step S302/NO) the processing is ended.

If any unanalyzed element remains at the step S302 (step S302/YES), the correlation-destruction-propagation detecting unit 25 calculates a total correlation destruction propagation (influence degree) and a total correlation propagation of this element (step S303), utilizing the destruction degree value recorded in the correlation destruction information data 33. Then, the abnormality calculation unit 26 calculates an abnormality degree for the element, by dividing the obtained total correlation destruction propagation by the obtained total correlation propagation (step S304).

Then, with regard to this calculation result on the abnormality degree, the fault analysis unit 27 judges whether the resultant value exceeds a predetermined threshold value (step S305). If there is no elements whose abnormality degree exceeds the predetermined threshold value (step S305/NO), the processing from the step S302 is continued. If any abnormality degree exceeds a predetermined threshold value, the fault analysis unit 27 presents that an abnormality has occurred on the corresponding element to an administrator via the administrator interaction unit 28 (step S306). Then, the processing from the step S302 is continued.

Figure 14A:
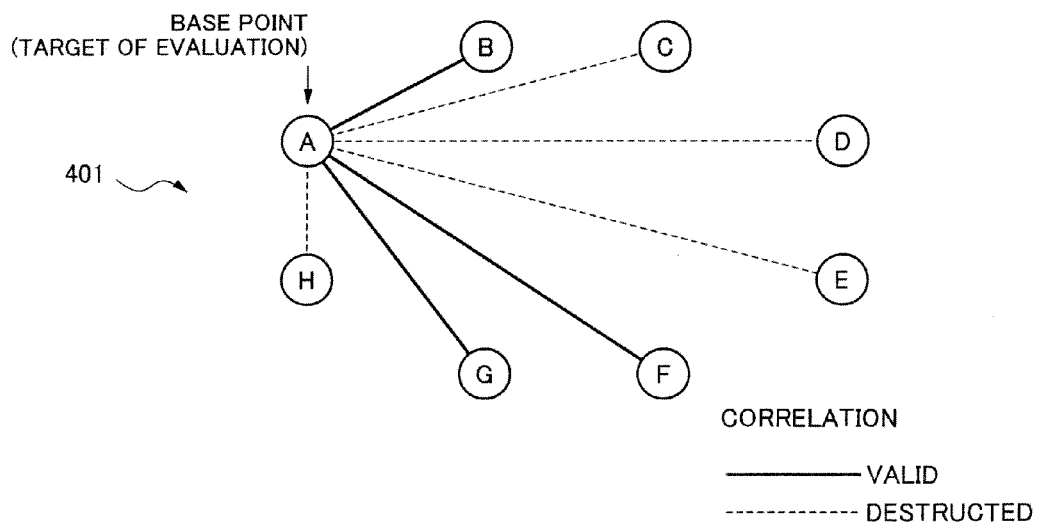
Figure 14B:
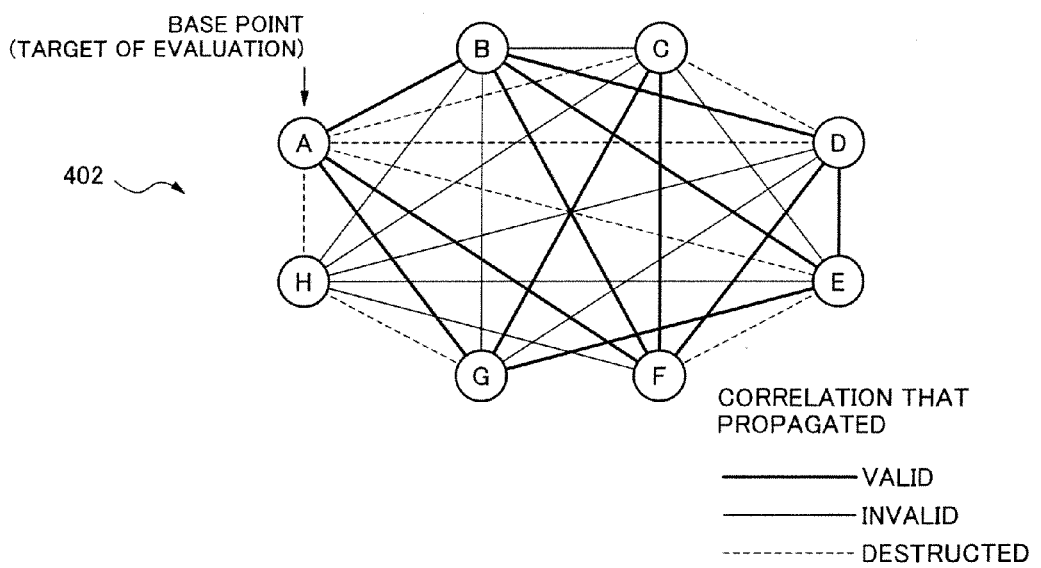

FIG. 14 is an explanatory diagram showing an example of the extent of the correlations used for calculating the abnormality degree. In FIG. 14, with regard to the eight elements from A to H, valid correlations are expressed by thick lines, invalid ones by thin lines, and destructed ones by broken lines. The correlation charts 401 and 402 each present a correlation chart with the element A regarded as a base point (that is, a target of evaluation). The correlation chart 401 presents a chart for hop(i) up to 1, that is, a chart comprising the elements neighbor to the base point element, which are the targets of processing for the fault cause extraction apparatus described in Japanese Patent Application Laid-Open No. 2009-199533 mentioned before. In contrast, the correlation chart 402 presents a chart including the elements of hop(i) equal to or greater than 2, which are the targets of processing for the fault cause extraction apparatus 10 according to the first exemplary embodiment of the present invention. That is, the fault cause extraction apparatus 10 of the first exemplary embodiment of the present invention expands the extent of the correlations used for calculating the abnormality degree to the whole of the fault cause extraction system 1.

(Overall Operation of the First Exemplary Embodiment)

Next, overall operation of the above-mentioned exemplary embodiment will be described. On the basis of the performance information on each of a plurality of performance items acquired from a plurality of managed equipments included in the system, the fault cause extraction apparatus 10 according to the first exemplary embodiment analyzes the performance information, regarding the performance item, the managed equipment or their combination as an element, and extracts the element which may be a cause of faults among the elements. The performance information accumulation unit 22 acquires the performance information including the performance values for each of a plurality of performance items from a plurality of managed equipments. The correlation model generation unit 23 derives at least a correlation function between the first performance series information indicating a time series variation of the performance information for a first element and the second performance series information indicating a time series variation of the performance information for a second element, and generates a correlation model, on the basis of the correlation function, for all pairs of the elements (FIG. 11 steps S101 to S105). On the basis of the performance information newly detected and acquired from the managed equipments, the correlation analysis unit 24 calculates, based on the newly detected performance values for the first element and the correlation function, a predictive performance value for the second element, and calculates a prediction error by comparing the newly detected performance value for the second element with the predictive value (FIG. 12, step S205). Then, the correlation analysis unit 24 analyzes whether the prediction error is within a predetermined error range (FIG. 12, step S206), and, in case the prediction error is out of the error range, judges that the correlation between the first and second elements is destructed (FIG. 12, step S207). When the correlation is destructed, the correlation-destruction-propagation detecting unit 25 calculates an influence degree for an arbitrary element in the correlation model (FIG. 13, step S303). The abnormality calculation unit 26 calculates an abnormality degree for an arbitrary element in a correlation model, on the basis of the influence degree calculated by the correlation-destruction-propagation detecting unit 25 (FIG. 13, step S304). When the abnormality degree is equal to or greater than a predetermined threshold value, the fault analysis unit 27 judges that an abnormality has occurred on the element (FIG. 13, step S305).

Here, it is possible that each of the above-described operation steps is put into a program so that it can be executed by a computer, and that the program is executed by the fault cause extraction apparatus 10, which is a computer to execute the above-described steps directly.

Figure 21:
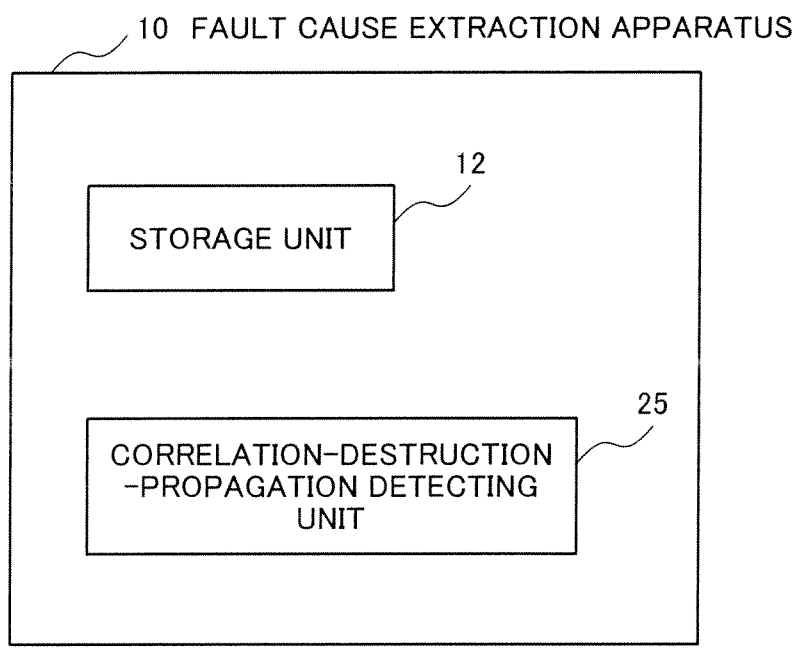

Next, the characteristic configuration of the first exemplary embodiment of the present invention will be described. FIG. 21 is a block diagram showing a characteristic configuration of the first exemplary embodiment of the present invention.

The fault cause extraction apparatus 10 includes a storage unit 12 and a correlation-destruction-propagation detecting unit 25.

The storage unit 12 stores a correlation model including one or more correlation functions, each of which is generated based on a time series of performance information including a plurality of types of performance values in a system and transforms a performance value for one of the types being an input to a performance value for another one of the types being an output.

The correlation-destruction-propagation detecting unit 25 calculates a degree of influence of a performance value for a base point that is one of the types upon the system, based on the number of base point propagation functions, the base point propagation functions being the correlation functions used to transform a performance value for the base point to a performance value for one of other the types being transformable from the base point directly or indirectly and not being input of the correlation function.

According to the first exemplary embodiment of the present invention, when there is propagation of correlation destruction, it is possible to detect accurately an element which is a possible cause of a fault. It is because the correlation-destruction-propagation detecting unit 25 calculates a degree of influence which an arbitrary element in a correlation model exerts on the correlations for which correlation destruction is detected, and the abnormality calculation unit 26 calculates a degree of abnormality for an arbitrary element in a correlation model, on the basis of the degree of influence.

Furthermore, it is possible to take measures such as equipment reinforcement through extracting the element which is a possible cause of future abnormalities, even if the abnormalities have not occurred clearly at present.

Further, according to the first exemplary embodiment of the present invention, it is possible to present clearly the influence which the element considered to be a possible cause of the fault exerts on the correlation destruction through the correlations, to an administrator. It is because the propagation of the correlation destruction can be visualized easily on a correlation chart.

(Second Exemplary Embodiment)

In a fault cause extraction apparatus 510 according to a second exemplary embodiment, a correlation-destruction-propagation detecting unit 525 of the fault cause extraction apparatus 10 further includes a function to calculate a maximum influence degree. The maximum influence degree is a maximum value of the influence degree calculated with regard to an arbitrary element in a correlation model.

With this function, even if no correlation destruction is detected, it is possible to simulate and extract an element which is a possible weak point in the fault cause extraction system 1.

Hereinafter, this will be described in more detail.

Figure 15:
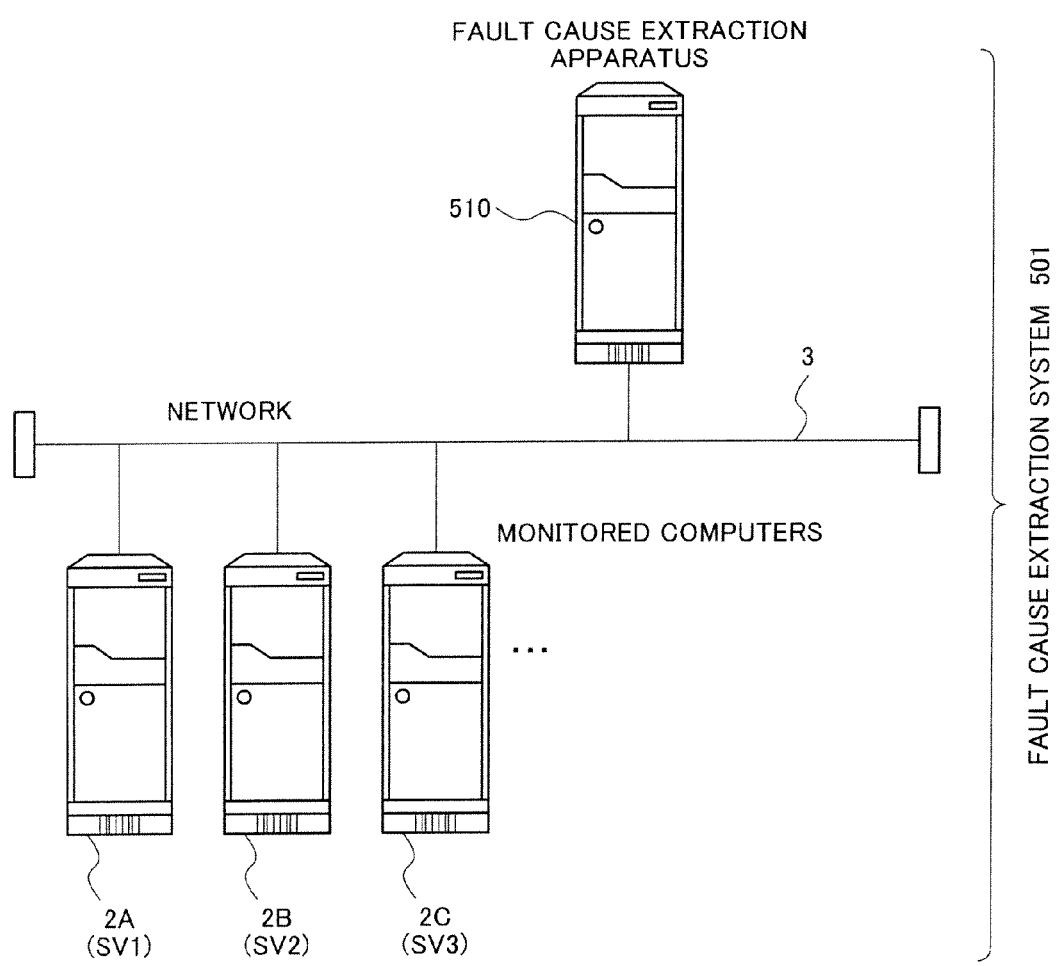

FIG. 15 is an explanatory diagram showing an example of schematic configuration for the whole of a fault cause extraction system 501 including the fault cause extraction apparatus 510 according to the second exemplary embodiment of the present invention. The fault cause extracting system 501 according to the second exemplary embodiment is obtained by substituting the fault cause extraction apparatus 10 in the fault cause extraction system 1, which was described in the first exemplary embodiment, with the fault cause extraction apparatus 510. Monitored computers 2A, 2B, 2C, . . . and a network 3 are identical with that in the first exemplary embodiment.

Figure 17:
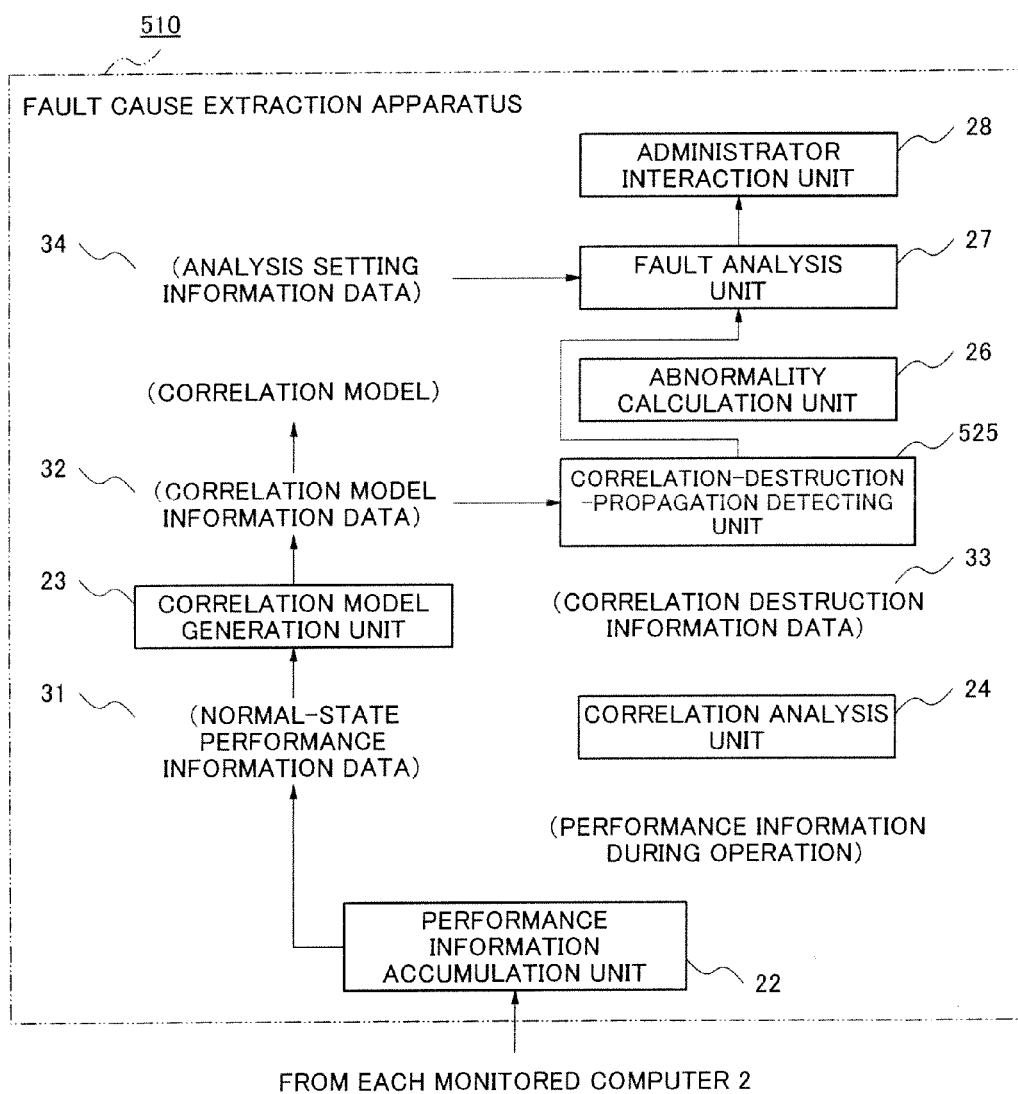

FIG. 16 is an explanatory diagram showing configurations of the fault cause extraction apparatus 510 and the monitored computers 2 according to the second exemplary embodiment of the present invention. FIG. 17 is an explanatory diagram showing a flow of the processing performed by the fault cause extraction apparatus 510 presented in FIG. 16. The operation of the correlation-destruction-propagation detecting unit 525 in the second exemplary embodiment is different from that of the correlation-destruction-propagation detecting unit 25 in the first exemplary embodiment. The point of the difference will be described below.

FIG. 18 is a flow chart showing an example of the processing in the fault cause extraction apparatus 510 according to the second exemplary embodiment of the present invention. Here, the operation to generate a correlation model from the performance information in a normal operating state in the second exemplary embodiment (step S11) is identical with that of the fault cause extraction apparatus 10 in the first exemplary embodiment presented in FIG. 10. However, subsequent detection of correlation destruction with regard to the performance information during operation (step S12 in FIG. 10) is not carried out in the second exemplary embodiment. In the second exemplary embodiment, with regard to the generated correlation model, the correlation-destruction-propagation detecting unit 525 calculates the total correlation propagation of each element as the maximum influence degree of the element, assuming that the correlation is destructed and the destruction degree thereof is 1 for every pair of the elements (Step S23). Also, the fault cause extraction apparatus 510 may perform, in addition to that, the operation similar to that shown in FIG. 10.

FIG. 19 is a flow chart showing an example of the detailed processing for an analysis of the propagation of correlation destruction indicated as the step S23 in FIG. 18. The correlation-destruction-propagation detecting unit 525 retrieves the correlation model information data 32 generated at the step S11 in FIG. 18 (step S601), and judges whether any unanalyzed element remains or not in the correlation model (step S602). If no unanalyzed element is remained (step S602/NO), the correlation-destruction-propagation detecting unit 525 represents the maximum influence degree so far and the extent of the influence in the processing to the administrator via the administrator interaction unit 28, and ends the processing.

If any unanalyzed element remains (step S602/YES), regarding an arbitrary element of one or more elements in the correlation model as a base point, and assuming that the value of n, the set of the correlations for which a correlation destruction is detected, and that of m, the set of the correlations, are the same in the above-described expressions 1, and assuming also that the destruction degree is 1 for every correlation destruction, the correlation-destruction-propagation detecting unit 525 calculates a maximum influence degree Fmax, which is the maximum total correlation destruction propagation (influence degree) calculated for the element, using the following expressions 3 (step S604).

$$F_{max} = \max\left(\sum_{i \in n} f_i\right) = \sum_{i \in m} \text{dump}(\text{hop}(i)) \qquad (3)$$

Figure 20:
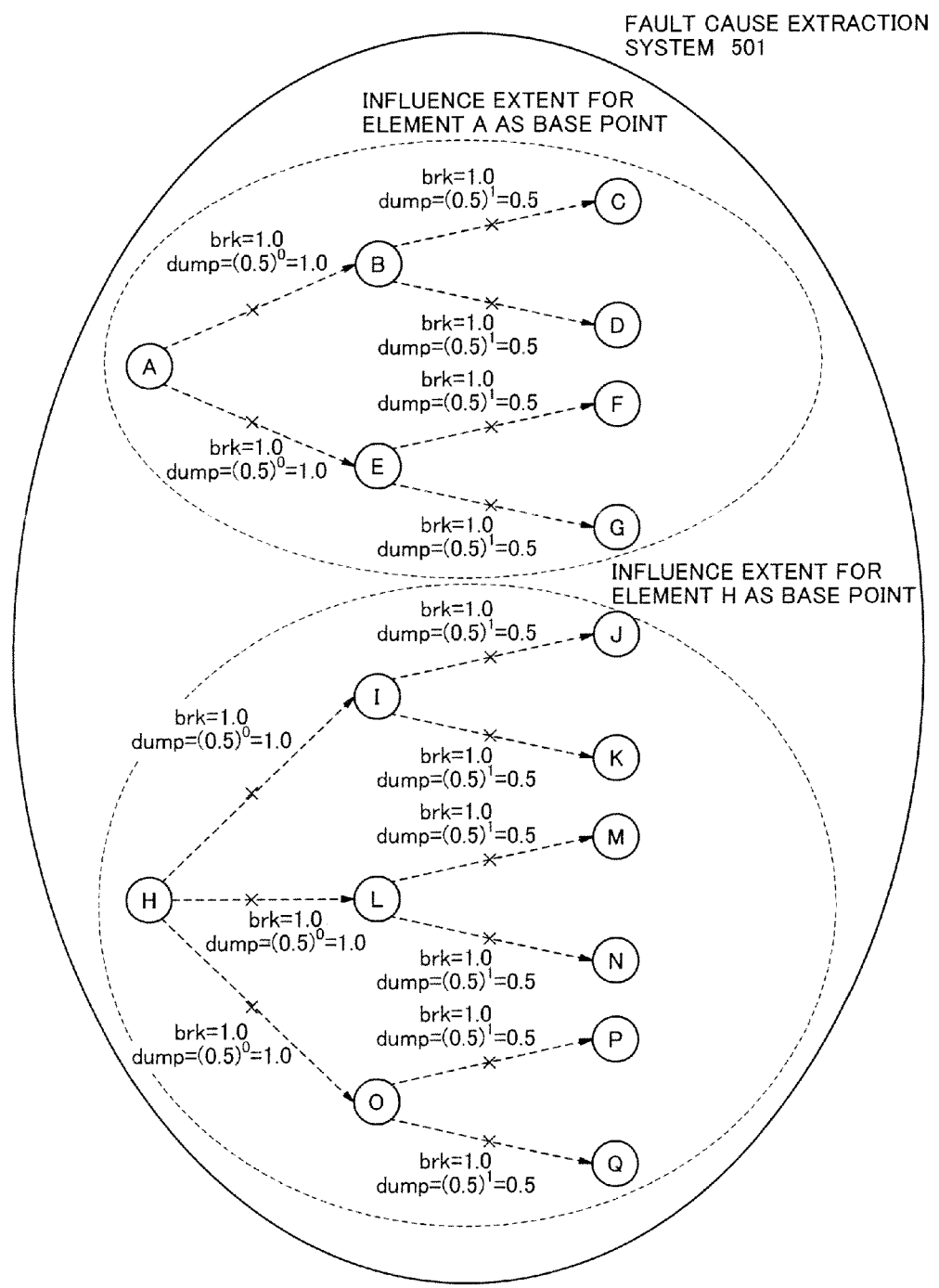

FIG. 20 is an explanatory diagram showing a concept of the calculation of the maximum influence degree presented at the step S604 in FIG. 19. In FIG. 20, the element A affects the correlations related to the elements from B to G, the element H affects the correlations related to the elements from I to Q. Hence the element H affects the correlations in a wider extent (more elements) than the element A, and consequently has a higher value of maximum influence degree. Note that, in the example shown in FIG. 20, damping rate is defined as dump (i)=0.5^(hop(i)−1) as in the equations 1 and 2.

According to the second exemplary embodiment of the present invention, by calculating a maximum influence degree assuming that every correlation in a correlation model is destructed, it is possible to simulate and extract an element which is a possible weak point in the fault cause extracting system 501, before a correlation destruction is actually detected. In a correlation model of the fault cause extraction system 501, there may be a case where a correlation exists from the element A to the element B but not from the element B to the element A, and a case where no correlations exist between the elements from the beginning. Due to this, even when every correlation is destructed and the destruction degree is regarded as 1, the extent in which the correlation destruction is detected due to the influence of a base point element is different, and consequently the maximum influence degree is different, from element to element.

In addition, by ranking the maximum influence degrees calculated in this processing, it is possible to extract easily which element exerts large influence on the whole of the fault cause extraction system 501 at the time of a fault. Accordingly, it becomes easy to take measures including reinforcement of the system's processing power and an alternation of the system configuration, with regard to an extracted element.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese Patent Application No. 2010-030071, filed on Feb. 15, 2010, the disclosure of which is incorporated herein in its entirety by reference.

Reference Signs List
1 and 501 Fault cause extraction system
2, 2A, 2B and 2C Monitored computers
3 Network.
10 and 510 Fault cause extraction apparatus
11 and 51 Main operation control unit
12 and 52 Storage unit
13 and 53 Communication unit
14 Input/output unit.
22 Performance information accumulation unit.
23 Correlation model generation unit.
24 Correlation analysis unit.
25 and 525 Correlation-destruction-propagation detecting unit
26 Abnormality calculation unit.
27 Fault analysis unit.
28 Administrator interaction unit.
31 Normal-state performance information data.
32 Correlation model information data.
33 Correlation destruction information data.
34 Analysis setting information data.
61 Service execution unit.
62 Information collection unit.
63 Countermeasure execution unit.

What is claimed is:

1. A fault cause extraction apparatus comprising:
a storage unit which stores a correlation model including one or more correlation functions, each of which is generated based on a time series of performance information including a plurality of types of performance values in a system and transforms a performance value for one of said types comprising an input to a performance value for another one of said types comprising an output; and
a correlation-destruction-propagation detecting unit which calculates a degree of influence upon said system of a performance value for a base point that comprises said one of said types, based on a number of base point propagation functions,
wherein said number of base point propagation functions equals a number of said correlation functions used to transform a performance value for said base point to a performance value for said other one of said types.

2. The fault cause extraction apparatus according to claim 1, further comprising a correlation analysis unit which applies inputted performance information into said correlation model and detects if there is a correlation destruction for each of said correlation function(s) included in said correlation model,
wherein said correlation-destruction-propagation detecting unit calculates said degree of influence based on the number of said base point propagation functions for which said correlation destruction is detected.

3. The fault cause extraction apparatus according to claim 2, wherein said correlation-destruction-propagation detecting unit multiplies a destruction degree representing a degree of said correlation destruction by a damping rate for each of said base point propagation functions for which said correlation destruction is detected, said damping rate decreasing in accordance with an order in which said base point propagation function is applied in a process of transformation from a performance value for said base point to a performance value for said type which comprises an output of said base point propagation function, and calculates said degree of influence by summing up said destruction degrees each multiplied by said damping rate.

4. The fault cause extraction apparatus according to claim 3, further comprising an abnormality calculation unit which calculates a degree of abnormality of said base point, by dividing said degree of influence calculated for said base point by a sum of said damping rates calculated for said respective base point propagation functions.

5. The fault cause extraction apparatus according to claim 4, further comprising a fault analysis unit which compares said degree of abnormality with a threshold.

6. The fault cause extraction apparatus according to claim 5, wherein said fault analysis unit determines that an abnormality has occurred when said degree of abnormality comprises one of greater than and equal to said threshold.

7. The fault cause extraction apparatus according to claim 1, wherein said correlation-destruction-propagation detecting unit calculates a damping rate for each of said base point propagation functions, said damping rate decreasing in accordance with an order in which said base point propagation function is applied in a process of transformation from a performance value for said base point to a performance value for said type which is an output of said base point propagation function, and calculates said degree of influence by summing up said damping rates.

8. The fault cause extraction apparatus according to claim 1, wherein said other one of said types is transformable from said base point directly or indirectly.

9. The fault cause extraction apparatus according to claim 1, further comprising a correlation analysis unit which applies inputted performance information into said correlation model and detects if there is a correlation destruction for each of said correlation function(s) included in said correlation model.

10. A fault cause extraction method comprising:
    storing a correlation model including one or more correlation functions, each of which is generated based on a time series of performance information including a plurality of types of performance values in a system and transforms a performance value for one of said types comprising an input to a performance value for another one of said types comprising an output; and
    calculating a degree of influence upon said system of a performance value for a base point that comprises said one of said types, based on a number of base point propagation functions,
    wherein said number of base point propagation functions equals a number of said correlation functions used to transform a performance value for said base point to a performance value for said other one of said types.

11. The fault cause extraction method according to claim 10, further comprising applying inputted performance information into said correlation model and detecting if there is a correlation destruction for each of said correlation function(s) included in said correlation model,
    wherein said calculating a degree of influence calculates said degree of influence based on the number of said base point propagation functions for which said correlation destruction is detected.

12. The fault cause extraction method according to claim 11, wherein said calculating a degree of influence multiplies a destruction degree representing a degree of said correlation destruction by a damping rate for each of said base point propagation functions for which said correlation destruction is detected, said damping rate decreasing in accordance with an order in which said base point propagation function is applied in a process of transformation from a performance value for said base point to a performance value for said type which is an output of said base point propagation function, and calculates said degree of influence by summing up said destruction degrees each multiplied by said damping rate.

13. The fault cause extraction method according to claim 12, further comprising calculating a degree of abnormality of said base point, by dividing said degree of influence calculated for said base point by a sum of said damping rates calculated for said respective base point propagation functions.

14. The fault cause extraction method according to claim 10, wherein said calculating a degree of influence calculates a damping rate for each of said base point propagation functions, said damping rate decreasing in accordance with an order in which said base point propagation function is applied in a process of transformation from a performance value for said base point to a performance value for said type which is an output of said base point propagation function, and calculates said degree of influence by summing up said damping rates.

15. A non-transitory computer readable storage medium recording thereon a program, causing a computer to perform a method, said method comprising:
    storing a correlation model including one or more correlation functions, each of which is generated based on a time series of performance information including a plurality of types of performance values in a system and transforms a performance value for one of said types being an input to a performance value for another one of said types being an output; and
    calculating a degree of influence upon said system of a performance value for a base point that comprises said one of said types, based on a number of base point propagation functions,
    wherein said number of base point propagation functions equals a number of said correlation functions used to transform a performance value for said base point to a performance value for said other one of said types.

16. The non-transitory computer readable storage medium according to claim 15, recording thereon said program, said method further comprising applying inputted performance information into said correlation model and detecting if there is a correlation destruction for each of said correlation function(s) included in said correlation model,
    wherein said calculating a degree of influence calculates said degree of influence based on the number of said base point propagation functions for which said correlation destruction is detected.

17. The non-transitory computer readable storage medium according to claim 16, recording thereon said program, wherein said calculating a degree of influence multiplies a destruction degree representing a degree of said correlation destruction by a damping rate for each of said base point propagation functions for which said correlation destruction is detected, said damping rate decreasing in accordance with an order in which said base point propagation function is applied in a process of transformation from a performance value for said base point to a performance value for said type which is an output of said base point propagation function, and calculates said degree of influence by summing up said destruction degrees each multiplied by said damping rate.

18. The non-transitory computer readable storage medium according to claim 17, recording thereon said program, said method further comprising calculating a degree of abnormality of said base point, by dividing said degree of influence calculated for said base point by a sum of said damping rates calculated for said respective base point propagation functions.

19. The non-transitory computer readable storage medium according to claim 15, recording thereon said program, wherein said calculating a degree of influence calculates a damping rate for each of said base point propagation functions, said damping rate decreasing in accordance with an order in which said base point propagation function is applied in a process of transformation from a performance value for said base point to a performance value for said type which is an output of said base point propagation function, and calculates said degree of influence by summing up said damping rates.

20. A fault cause extraction apparatus comprising:
    storage means for storing a correlation model including one or more correlation functions, each of which is generated based on a time series of performance information including a plurality of types of performance values in a system and transforms a performance value for one of said types being an input to a performance value for another one of said types being an output; and
    correlation-destruction-propagation detecting means for calculating a degree of influence upon said system of a performance value for a base point that comprises said one of said types, based on a number of base point propagation functions, wherein said number of base point propagation functions equals a number said correlation functions used to transform a performance value for said base point to a performance value for said other one of said types, and wherein said other one of said types is transformable from said base point directly or indirectly and comprises other than said input.

* * * * *